United States Patent [19]

Webb

[11] Patent Number: 5,527,130

[45] Date of Patent: * Jun. 18, 1996

[54] ENVIRONMENTALLY SAFE UNDERGROUND PIPING SYSTEM

[75] Inventor: Michael C. Webb, Chester Springs, Pa.

[73] Assignee: Environ Products, Inc., Lionville, Pa.

[*] Notice: The portion of the term of this patent subsequent to Oct. 28, 2012, has been disclaimed.

[21] Appl. No.: 70,271

[22] Filed: Jun. 1, 1993

Related U.S. Application Data

[63] Continuation-in-part of Ser. No. 967,716, Oct. 28, 1992, which is a continuation of Ser. No. 857,361, Mar. 25, 1992, Pat. No. 5,297,896, which is a continuation-in-part of Ser. No. 838,615, Feb. 19, 1992, Pat. No. 5,263,794.

[51] Int. Cl.$^6$ ........................................ F16L 1/00
[52] U.S. Cl. .................................. 405/52; 405/128
[58] Field of Search .................. 405/52, 53, 154, 405/128; 285/915, 342, 343, 131.1; 138/103, 173

[56] References Cited

U.S. PATENT DOCUMENTS

| | | | |
|---|---|---|---|
| 4,182,581 | 1/1980 | Uehara et al. | 405/43 |
| 4,659,251 | 4/1987 | Petter et al. | 405/52 |
| 4,662,655 | 5/1987 | Fliervoet et al. | 285/915 X |
| 4,865,359 | 9/1989 | Roberts | 285/94 |
| 4,870,856 | 10/1989 | Sharp | 285/915 X |
| 4,886,304 | 12/1989 | Kunsman | 285/342 X |
| 4,886,305 | 12/1989 | Martin | 285/133.1 |
| 4,932,257 | 6/1990 | Webb | 73/40.5 |
| 4,958,957 | 9/1990 | Berg et al. | 405/55 |
| 4,968,179 | 11/1990 | Frahm | 405/53 |
| 4,971,477 | 11/1990 | Webb et al. | 405/154 |
| 5,030,033 | 7/1991 | Heintzelman et al. | 405/128 |
| 5,098,221 | 3/1992 | Osborne | 405/128 X |
| 5,135,324 | 8/1992 | Bravo | 405/52 |
| 5,141,260 | 8/1992 | Burwell | 405/128 X |
| 5,152,635 | 10/1992 | Ziu | 405/52 |
| 5,186,502 | 2/1993 | Martin | 285/133.1 |
| 5,257,652 | 11/1993 | Lawrence | 405/128 X |
| 5,297,896 | 3/1994 | Webb | 405/52 |
| 5,343,738 | 9/1994 | Skaggs | 73/40.5 |

FOREIGN PATENT DOCUMENTS 0207015  6/1986  European Pat. Off. .

OTHER PUBLICATIONS

Enviroflex™—The Flexible Double-Wall Piping System, Copyright 1990.

Primary Examiner—Dennis L. Taylor
Attorney, Agent, or Firm—Eugene E. Renz, Jr.; John A. Parrish

[57] ABSTRACT

A secondarily contained underground piping system which interconnects at least one underground storage tank dispensing pump to at least one above-ground dispensing unit. The system includes an originating chamber surrounding the dispensing pump and having at least one opening therein for pipe access thereto. A terminating chamber is positioned directly under the above-ground dispensing unit and includes at least one opening therein for pipe access thereto. A transfer pipe is operably connected from the dispensing pump to the above-ground dispensing unit, and passes through the openings in the originating chamber and the opening in the terminating chamber. Seals are provided for sealing the passage of the transfer pipe through the openings. The transfer pipe includes an inner primary supply pipe for transferring fuel and an outer secondary containment pipe for defining an interstitial space between the primary pipe and the containment pipe.

24 Claims, 17 Drawing Sheets

FIG. 4
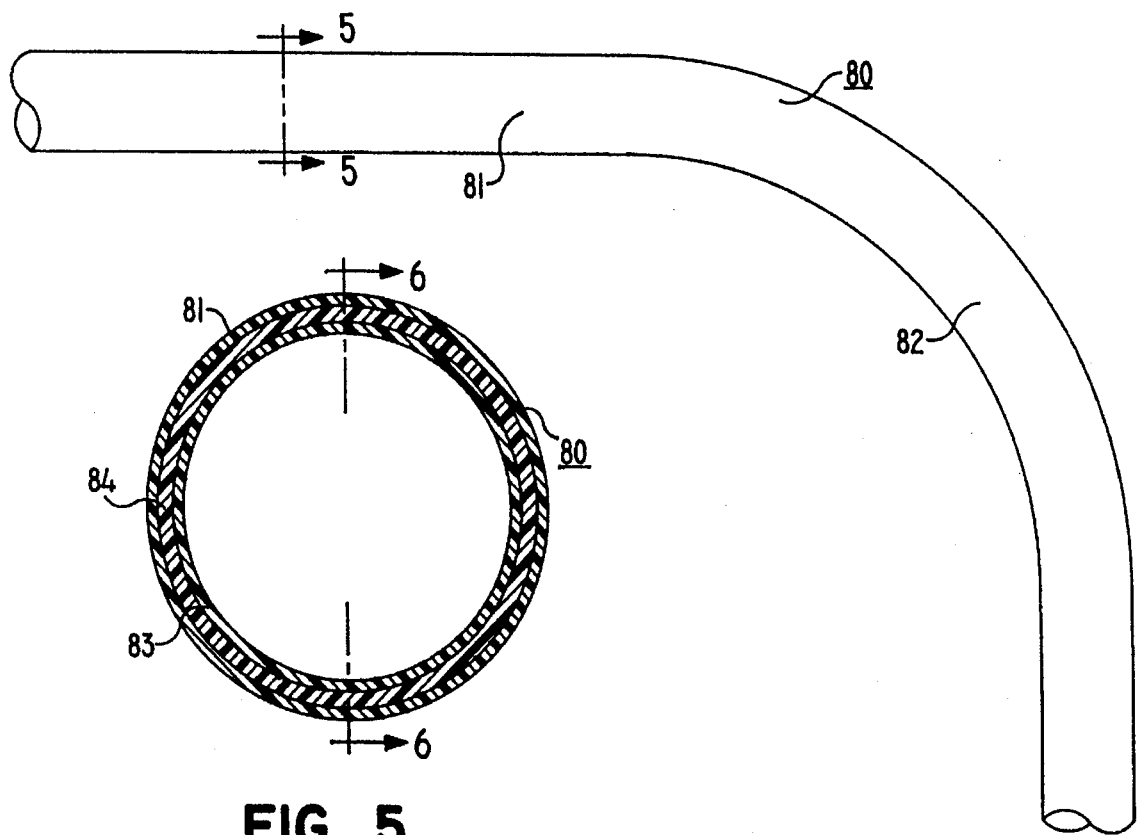
FIG. 5
FIG. 6
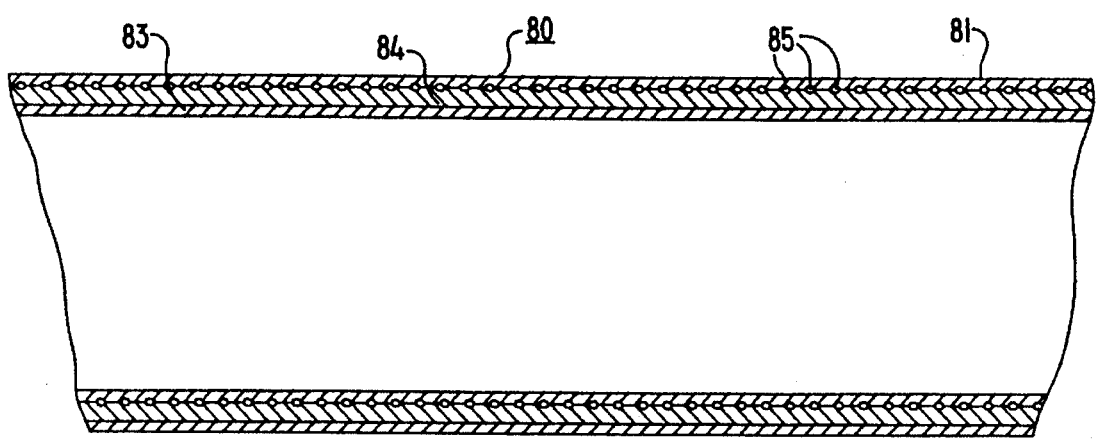

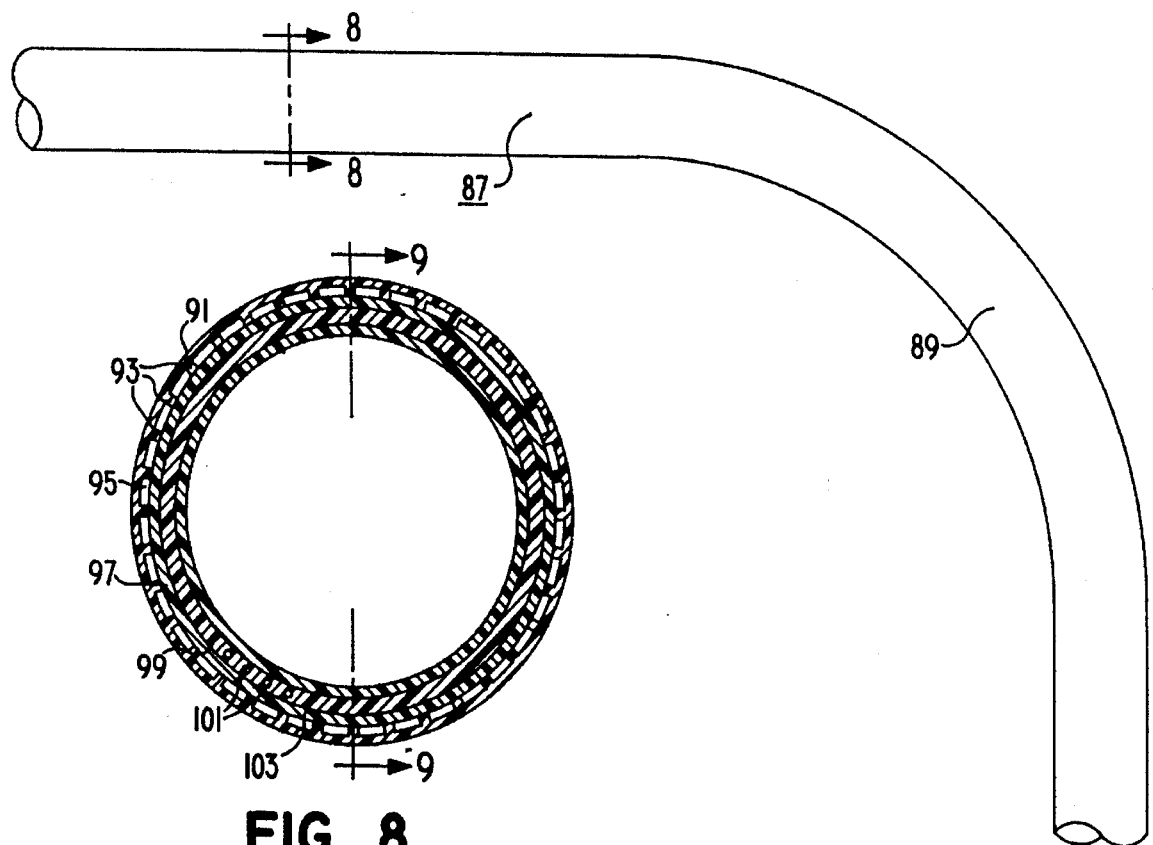
FIG. 7
FIG. 8
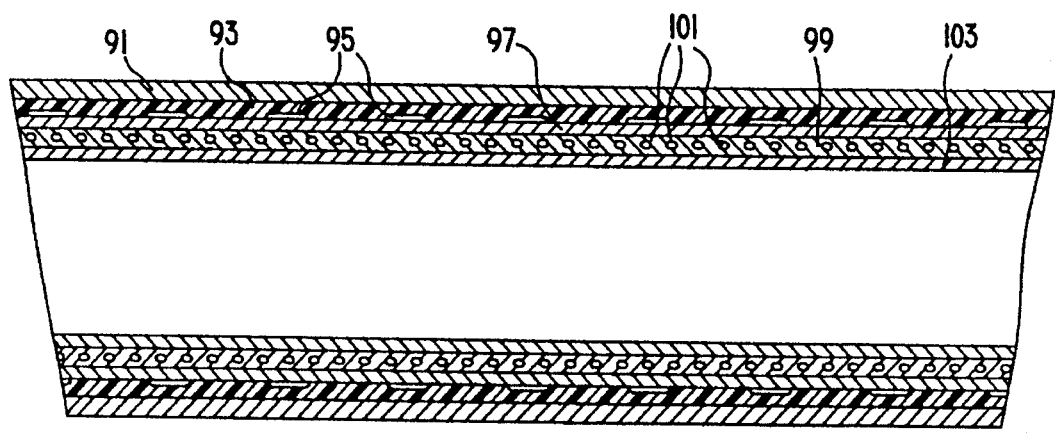
FIG. 9

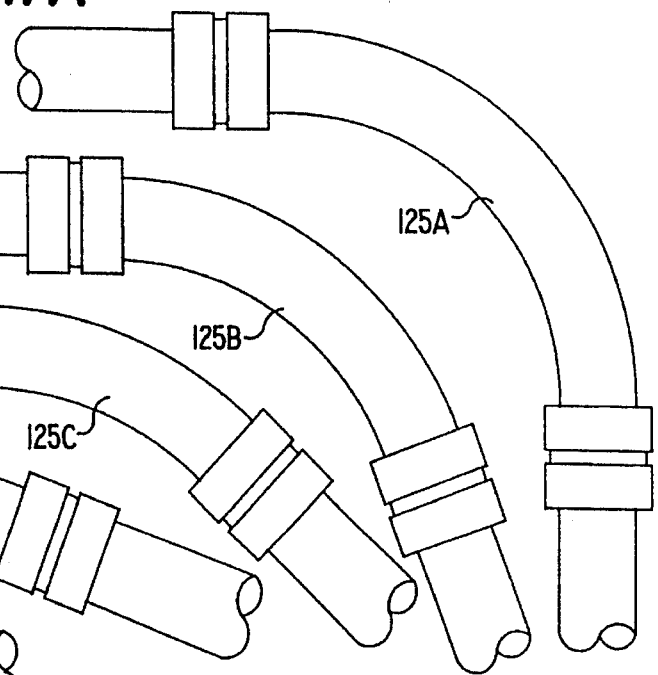
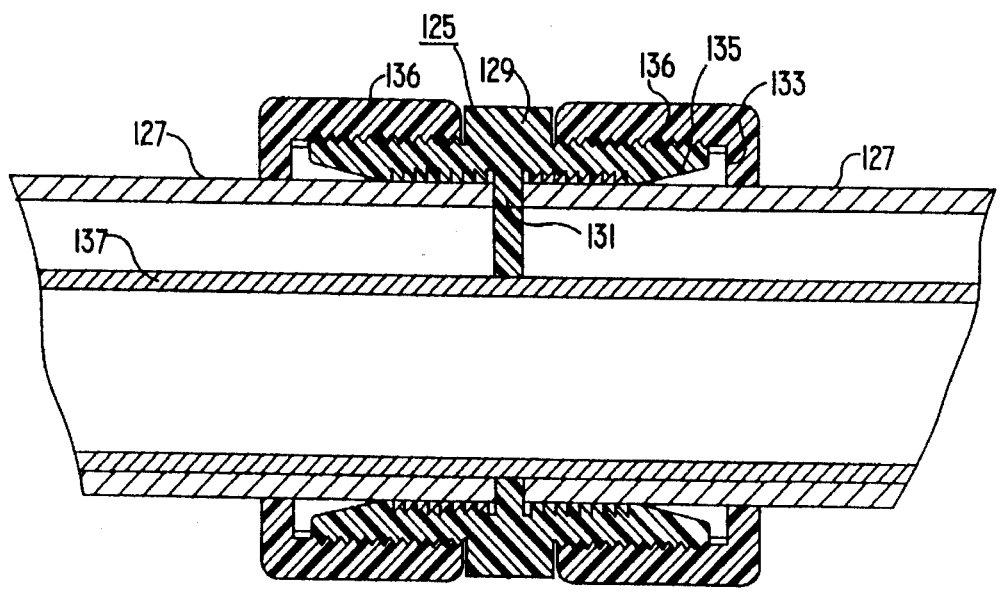
FIG. 17A
FIG. 17B
FIG. 17C
FIG. 17D
FIG. 17E
FIG. 18

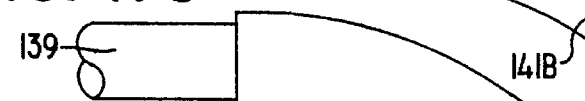
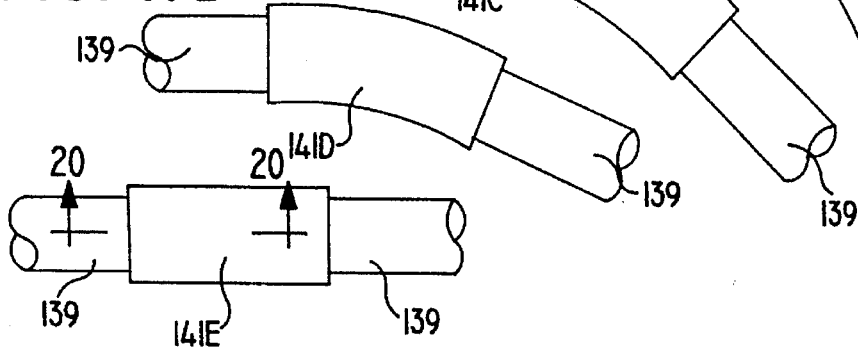
FIG. 19A
FIG. 19B
FIG. 19C
FIG. 19D
FIG. 19E
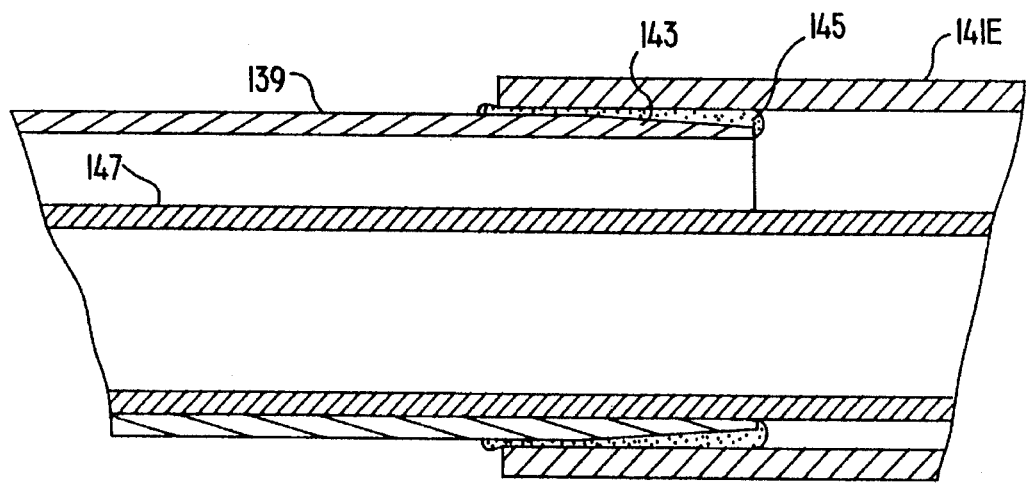
FIG. 20

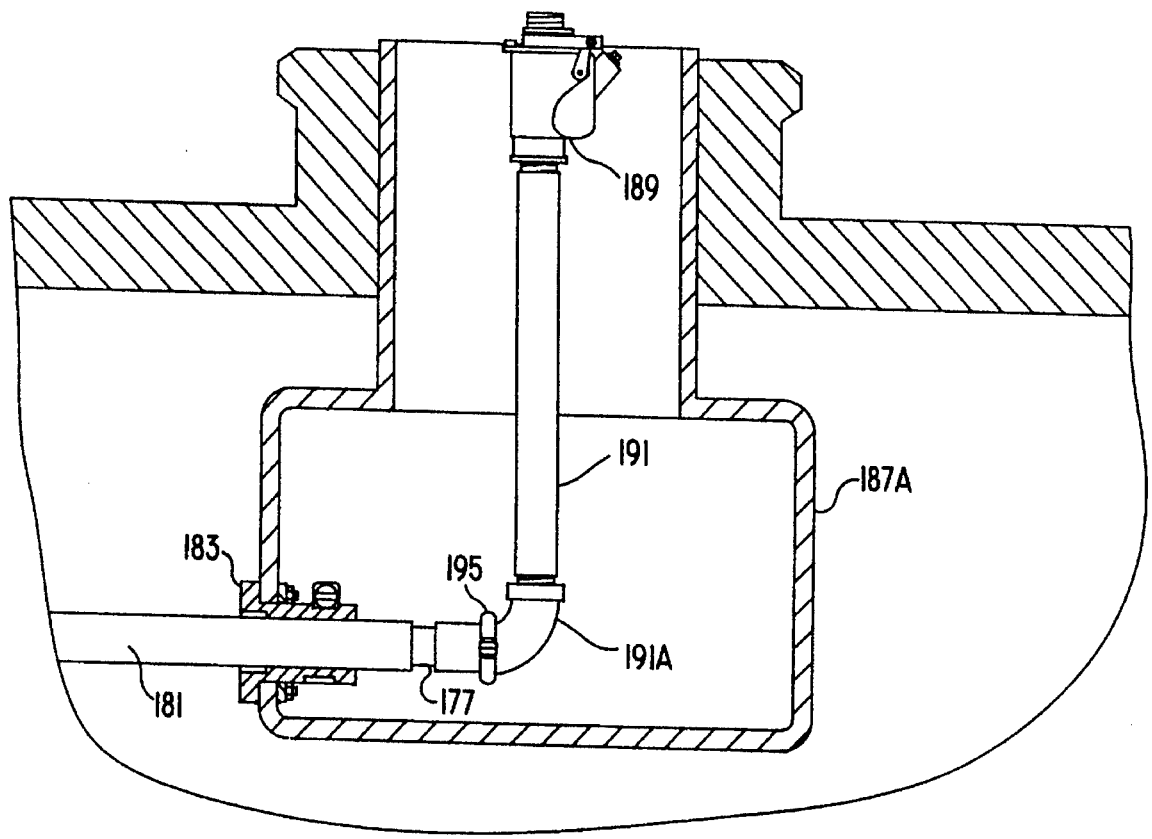
FIG. 24
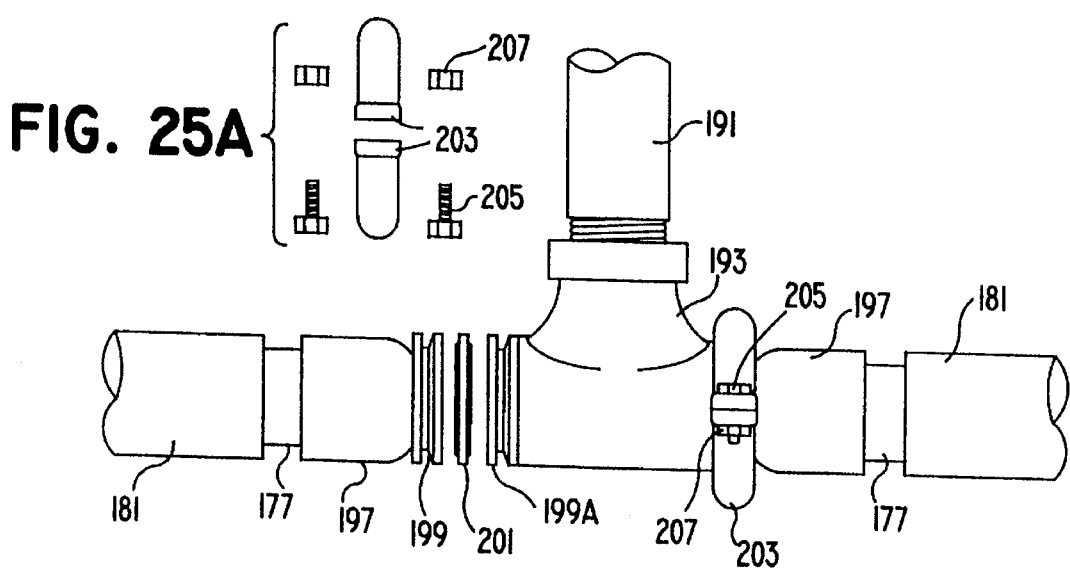
FIG. 25A
FIG. 25B

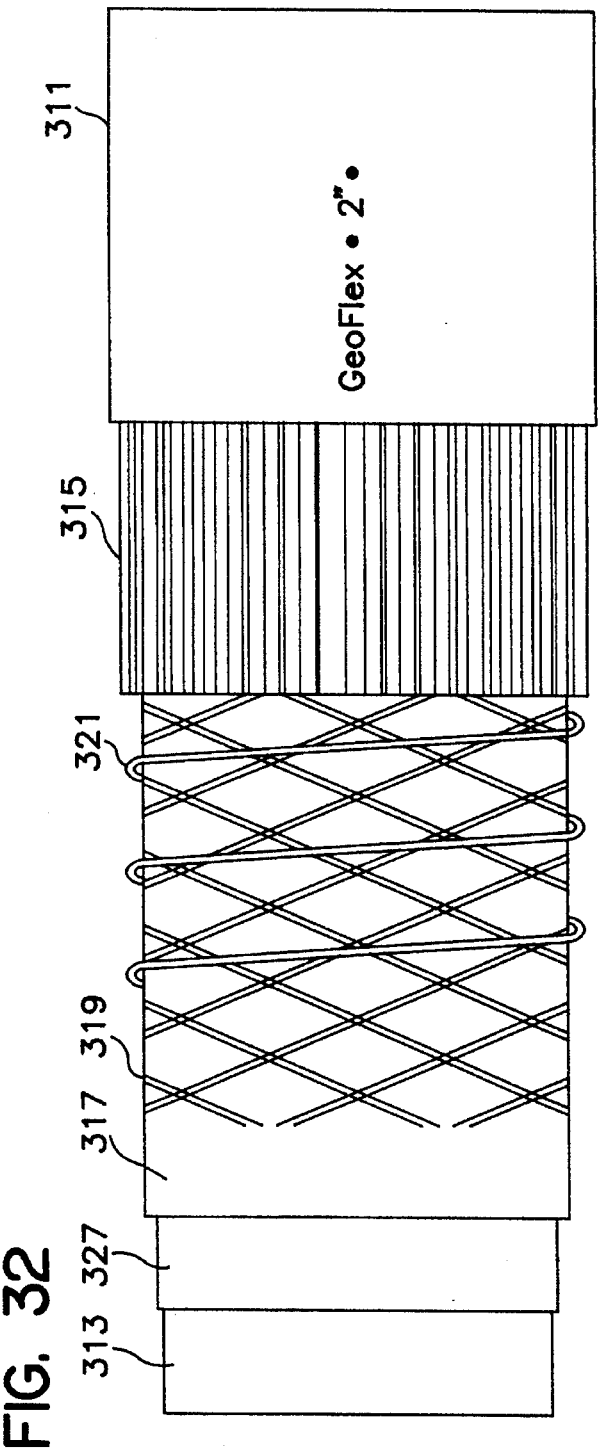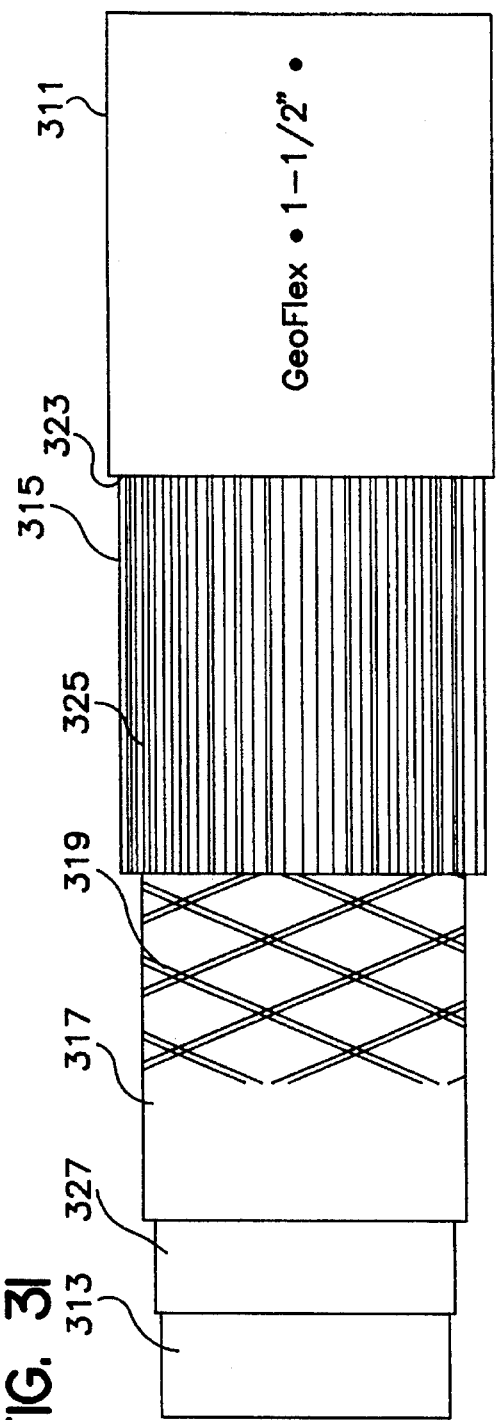

ENVIRONMENTALLY SAFE UNDERGROUND PIPING SYSTEM

This is a continuation-in-part application of my application Ser. No. 07/967,716, filed Oct. 28, 1992, which is a continuation of my application Ser. No. 07/857,361, filed Mar. 25, 1992, now U.S. Pat. No. 5,297,896, which is a continuation-in-part of my application Ser. No. 07/838,615, filed Feb. 19, 1992, now U.S. Pat. No. 5,263,794.

FIELD OF THE INVENTION

The present invention relates to an environmentally safe underground piping system which is secondarily contained to prevent hazardous fluids from escaping into the surrounding environment. More particularly the present invention relates to systems and various piping arrangements used in those systems to provide improved protection for the environment.

BACKGROUND OF THE INVENTION

In recent years there has been an increased awareness that the underground storage and distribution systems of hazardous fluids, such as hydrocarbon fuels and a diversity of chemicals, need to be improved to prevent any product leaking from these systems from escaping into the environment and contaminating the underground drinking water. Both public health and fire safety regulatory bodies have imposed strict guidelines and regulations on such systems to insure public safety.

Leaking underground storage tanks and their associated underground piping systems became the focus of the Federal Environmental Protection Agency (EPA) which initiated federal and state legislation that would require an improved means of storage, distribution, leak detection and accounting of all stored fluids which are deemed to be hazardous. The EPA conducted studies which showed that underground piping failures were caused by poor installation practices, corrosion and structural failure, and these factors were responsible for most of the leaks reported.

In response to this public awareness and concern, equipment specifies and manufacturers have developed improved piping systems in recent years to provide a greater degree of protection around the primary fluid supply piping, commonly referred to as "secondary containment".

In addition to the regulatory bodies mentioned above, facility owners and their insurance companies have become very concerned with the type of materials used and the design specifications of existing, new and proposed fuel storage, transmission and dispensing equipment. An important area of concern is the chemical compatibility of the materials used in the construction of both the primary and secondary containment systems. As a result, Underwriters Laboratories Inc. (UL), a nationally recognized and accepted independent testing laboratory, has already established and proposed new standards for both the primary and secondary containment underground storage, transmission and dispensing equipment. Acceptable materials for use in this application generally relate to the material's stability when exposed to conditions and chemicals additives, as well as other chemicals being stored and dispensed. In addition, another area of concern is the ability of a material to provide an acceptable containment barrier for the product to be stored. The product permeability rating of a material is generally accepted by regulators and UL as being more stringent for the primary storage vessel than the secondary containment vessel, which only provides a means of temporary storage of leaking product until detected and corrected.

For example, UL has established and proposed new standards which include acceptable permeability levels for the primary containment and secondary containment storage and dispensing systems. These standards require that a typical primary wall section should not be able to permeate more than 1% of its stored product weight over a period of 270 days, whereas a typical secondary containment wall section should not be able to permeate more than 1% of its stored product over a period of 30 days. Keeping these standards in mind, UL listed products for storage of hazardous liquids and fuels must be constructed of the proper materials at the acceptable thickness to provide a satisfactory level of environmental protection and fire safety.

For purpose of this description, "underground piping systems" is defined as the means of transferring hazardous liquids from a buried underground storage "tank", by the tanks electrically powered dispensing "pump" to a generally metered dispensing unit or "dispenser", generally located above ground. An underground piping system which is secondarily contained by a larger diameter piping system is generally referred to as a "double-wall piping system". The primary distribution pipe which is contained is commonly referred to as the "supply pipe" and the larger outer secondary containment pipe is commonly referred to as the "containment pipe". Other secondary containment components, such as surface access chambers, which are installed around the tanks pump and underneath a dispenser, are commonly referred to as "access sumps". These storage, transferring and dispensing systems, are typically found at service stations which market gasoline and diesel fuel.

Equipment manufacturers have in recent years introduced both patented and non-patented supply piping systems and/or secondary containment systems for these supply piping systems of various designs and material sections. The following double wall piping systems, which are considered to be prior art to this invention, are disclosed as follows.

One secondarily contained underground piping system features a non-flexible fiberglass supply pipe system fully contained by a larger non-flexible fiberglass containment piping system. One such system also includes the feature of telescoping containment pipe, whereby two non-flexible containment pipes are offered, one with a slightly larger inside diameter than the outside diameter of the other. This permits the larger pipe to be installed over the smaller pipe therefore exposing more of the supply pipe contained within both. The containment pipe and fittings are of a larger inside diameter than the outside diameter of the supply pipe and fittings contained within. The short bend radius containment fittings and couplings are of a clamshell design (two piece) to permit bend radius containment fittings prior to assembly of the containment piping system. Both the supply and containment piping components are joined together by heat activated resins to insure a liquid tight joint. These systems are generally difficult to install due to the nature of their design and joining system. Both the supply and containment piping system are made of fiberglass which provides excellent chemical compatibility and impermeability.

Another secondarily contained underground piping system features a non-flexible fiberglass or steel supply pipe fully contained by a combination of both a larger flexible and non-flexible polyethylene telescoping containment pipe. The telescoping containment pipe design permits complete inspection of the supply pipe line during assembly and integrity testing. This containment piping system includes a flexible containment pipe which is sufficiently flexible to go around and contain short bend radius supply elbow fittings. An oversized short bend radius containment tee fitting is provided for insertion, assembly and inspection of the smaller short bend radius supply tee fittings before the containment system is assembled. The containment components of this system are joined by means of a metal wall thickness and density to offer the level of impermeability necessary to meet the UL standard. The non-flexible polyethylene containment pipe is of sufficient wall thickness and density to meet the UL standard. Both the contained fiberglass or steel supply pipe will meet the UL standard. The metal fastener used to make a compression also will not meet the UL standard for corrosion resistance.

Another secondarily contained underground piping system features a non-flexible fiberglass or steel supply pipe fully contained by a larger non-flexible polyethylene telescoping containment pipe. The telescoping containment pipe design permits the complete inspection of the supply pipe line during assembly and integrity testing. This containment piping system includes short bend radius clamshell (split) containment fittings that permit assembly and inspection of the smaller shorter bend radius supply fittings before the clamshell containments are assembled over them. The containment components of these systems are generally joined by means of metal fasteners and flexible seals. Both the non-flexible polyethylene containment pipe and contained fiberglass or steel pipe will meet the UL standard.

Yet another secondarily contained underground piping system features a fiberglass or steel non-flexible supply pipe partially contained by a flexible membrane piping trench liner. This type of secondary containment system provides a single containment system for a multitude of supply pipe lines contained within. These piping trench lining systems are generally custom fabricated at the job site and are typically joined by mechanical means using metal fasteners and flexible seals. These piping containment systems are often difficult to install, are damage prone, become directionally limiting, and do not provide a full measure of secondary containment. The material composition of these liners do not offer sufficient wall thickness or density to meet the UL standards. The metal fasteners used to make a compression will not meet the UL standard for corrosion resistance.

Still another secondarily contained underground piping system features a fiberglass or steel non-flexible supply pipe partially contained by a non-flexible fiberglass trench liner. This type of secondary containment system provides a single containment system for a multitude of supply pipe lines contained within. These piping trench lining systems are generally factory fabricated and shipped in large sections for assembly at the job site and are joined by heat activated resins in combination with glass fiber reinforcement. The material composition of these liners is sufficient to meet the UL standards.

Another secondarily contained underground piping system features a flexible nylon composite supply pipe fully contained by a larger flexible polyethylene containment pipe. The flexible supply pipe has internal corrugations for added flexibility and requires metallic couplings installed on each end of a pipe section for attachment to a metallic short bend radius tee or elbow supply fitting. The flexible containment pipe is a thin wall tube which is arrogated to provide added flexibility and structural strength. This type of secondarily contained piping system requires the use of access sumps which are interconnected by continuous runs of both flexible supply and containment pipe sections. These access sumps provide a means of containment for the metallic supply couplings and fittings as well as the containment pipe connections. Both the supply and containment components are joined by mechanical means using rubber gaskets and washers for seals. The material composition of the flexible supply pipe will not meet the UL standards for primary containment of alcohol and alcohol blended fuels. The material composition of the flexible containment pipe is not of sufficient thickness or density to meet the UL standards for secondary containment.

Another secondarily contained underground piping system features a flexible rubber composite supply pipe fully contained by a larger flexible polyurethane composite containment pipe. The flexible supply pipe is made of a rubber elastomeric material for flexibility, and requires metallic couplings installed on each end of a pipe section for attachment to a metallic short bend radius tee or elbow supply fitting. This type of secondarily contained piping system requires the use of access sumps which are interconnected by continuous runs of both flexible supply and containment pipe sections. These access sumps provide a means of containment whereby the components are joined by mechanical means using rubber gaskets and washers for seals. The material composition of the flexible supply pipe will not meet the UL standard for primary containment.

In addition to the secondarily contained underground piping systems described above, a number of fiberglass and steel tank manufactures, as well as piping and specialty containment manufacturers, have introduced access sumps to the market. These access sumps originated from a product called a "back fill retainer" which was simply a round cylinder, open at the top and bottom, which was installed around the tank's pump and under the street access manhole to keep the back fill materials away from the pump and various plumbing connections. Often a short section of corrugated metallic culvert was used for this purpose. In the early 1980's fiberglass tank manufacturers began to offer an improved back fill retainer, called a riser and riser extension, which connected to the tank and was made of non-corrodible fiberglass material. Steel tank manufactures soon followed with their own version of a riser made of coated steel. When the industry became aware that underground tanks and piping needed to be secondarily contained, they also turned their attention to the tank's pump and miscellaneous plumbing connections. Soon thereafter, pump access chambers appeared on the market as a means for secondarily containing the tank's pump and associated plumbing connections. With the introduction of these watertight chambers it was quickly recognized that they could also be used as a fluid collection and detection sump for the attached secondarily contained piping systems described above. Because these chambers were located at the low end of a sloped secondarily contained piping line, they were the logical choice as the collection point for any leaking product which was contained inside the containment pipe. From this point on they were considered to be a multi-purpose chamber and are now commonly referred to as pump access sumps.

As the full scope of secondary containment requirements began to unfold, attention was turned to the causes of product leaks from within and under the above ground dispenser, such as leaking plumbing joints and spillage from required fuel filter changes. The solution seemed to be a shallow collection sump installed directly under the dispenser. The first dispenser collection sumps were shallow and were commonly referred to as dispenser pans. Soon thereafter it was recognized that a deeper dispenser pan was required to contain the entire metallic flexible connector which was installed directly under the dispenser. These deeper dispenser pans became commonly known as dispenser access sumps. These dispenser access sumps were not developed as an extension of the secondarily contained piping systems, but rather were adapted to accommodate these piping systems.

Manufacturers of these access sumps began to offer a means of attaching and sealing various pipe and conduit entries into these access sumps. One approach was to pre-install cuffed openings at various locations in the side wall of the access sump. Manufacturers of fiberglass access sumps laminated fiberglass couplings into the side wall of the access sump for attachment of fiberglass pipe by means of fiberglass lamination or by means of a common rubber reducer seal used in the plumbing industry. Manufacturers of steel access sumps provided welded-on couplings that served a similar purpose. Later, as molded polyethylene access sumps began to be introduced to the market, a variety of pipe entry seals were employed to accommodate all the available types of piping systems. The first seal was a plastic molded cuff installed over an opening in the side wall attached in the field by means of plastic welding. This plastic cuff was similar in design and purpose to those provided with the fiberglass and steel access sumps for sealing pipe entries. More recently, a conventional plastic bulkhead fitting was used for conduit entries. A commercially available rubber grommet was also offered to replace the plastic cuffs and bulkhead fittings for sealing both pipe and conduit entries. The rubber grommet was installed into an opening in the side wall of the access sump. A rubber flanged boot has also been offered as a solution to the leaking rubber grommets. This rubber boot is inserted inside an opening in the side wall of the access sump and mechanically attached to the side wall by means of bolt fasteners. The significant advantage of this type of sealing device is that it provides a watertight seal for both conduit and pipe entries that could be installed in any desired location in the side wall of the access sump. These various sealing devices evolved over time to accommodate most of the secondarily contained piping systems described above.

Two other types of conduit sealing means were developed for specific applications. First, plastic internal facing cuffs were molded at specific locations into the side wall of polyethylene access sumps to seal flexible corrugated polyethylene containment pipe entries. These sumps were a required component of a secondarily contained underground piping system which featured a flexible nylon composite supply pipe fully contained by a larger flexible polyethylene containment pipe. Second, plastic external facing cuffs were integrally molded at specific locations into the side wall of polyethylene access sumps to seal thick walled smooth flexible containment pipe entries. These sumps were required components of a secondarily contained underground piping system which featured a flexible rubber composite supply pipe fully contained by a larger flexible polyurethane composite containment pipe.

The introduction a number of years ago of continuous flexible supply pipe was a means of reducing the amount of connection joints in the supply pipe compared to the commonly used steel and fiberglass non-flexible supply piping systems. The first flexible supply pipe introduced was a non-contained thin walled flexible copper tubing which was directionally bent to accommodate the routing required to connect the tank's pump to the various dispensers. The second flexible supply piping system, introduced in Europe, comprised a direct burial or non-contained flexible polyethylene tubing which had thick walls and offered only a limited amount of flexibility. Both of these flexible supply piping systems did not require the use of access sumps. The third flexible supply piping was introduced several years ago and was secondarily contained inside a flexible containment pipe and did require the use of access sumps. Two versions of this type of flexible piping system were introduced approximately at the same time and are briefly described above.

Some notable advantages of these flexible, double wall piping systems include considerably fewer piping joints than conventional double wall piping systems, and the unique feature of allowing removal of the supply pipe in the event of a problem without the need for excavation. These systems feature continuous lengths of piping. From these long lengths, pipe sections may be custom cut to predetermined lengths for installation between two or more surface access sumps. This feature eliminates the need for directional fittings in the flexible containment pipe line, thus eliminating the need for piping joints between the interconnected access sumps. The flexible primary piping system does require the use of some directional fittings, but these fittings are located within the surface access sumps where they are accessible for inspection and maintenance. This piping design permits complete access to, and observation of, all the primary and secondary piping joints from the ground surface without the need for excavation.

Some notable disadvantages of both of these flexible, double wall piping systems also have been observed. Thin walled corrugated flexible containment pipe is easy to damage and difficult to repair. The inner corrugations restrict fluid migration from the source of the leak to the collection sump. The thin polyethylene material will not meet the UL standard for secondary containment. Alternatively, thick walled non-corrugated flexible containment pipe requires the use of a soft elastomeric material in order to achieve limited flexibility. It is questionable as to whether or not this material will meet the UL standard for secondary containment. Inner corrugated flexible supply pipe provides good flexibility, but has poor hydraulic flow efficiency and low maximum operating pressure. The internal corrugations cause to pipe to be pressure expandable, which can produce faulty readings for in-line leak detection devices, and make it difficult to connect internally expanded coupling devices, which could result in a leak. Thick walled flexible rubber supply pipe is heavy and has a high resistive outer surface which makes it difficult to install into the flexible containment pipe. Rubber material is also an unsatisfactory material to use as a supply pipe and will not likely meet the UL standard for primary containment.

All of the secondarily contained piping systems and access sumps discussed above have developed over a relatively short period of time in response to the continuously changing environmental and safety regulations. The design criteria used by various manufacturers for the development of their products was dependent on what they considered to be important, and what they felt they had the capability to produce. As a result, none of the assembled systems described above is the absolute solution to a secondarily contained underground piping system. Certain component parts and design concepts of these discussed containment systems provide only partial solutions in developing an ideal piping containment system which meets the most important design criteria.

SUMMARY OF THE INVENTION

It is the objective of the present invention to provide environmentally safe piping systems which improve on the design, material selection, installation and cost deficiencies of prior art underground piping systems such as those described above. These double wall piping systems are intended to be used for conveying hazardous liquids from an underground storage tank to an above ground liquid dispensing unit typically found at fuel service stations.

More particularly, it has now been discovered that an improved double-wall piping system may be provided in the following manner. Similarly, specific improved double-wall pipe designs have been discovered which provide important and needed advantages.

Specifically, a secondarily contained underground piping system has been discovered which interconnects at least one underground storage tank dispensing pump to at least one above ground dispensing unit. The system comprises an originating chamber which surrounds the dispensing pump and which includes at least one opening for pipe access thereto. Also provided is a terminating chamber positioned directly under the above-ground dispensing unit and including at least one opening therein for access by a pipe. A transfer pipe is operably connected to the dispensing pump and to the above-ground dispensing unit. The transfer pipe passes through the opening in the originating chamber and the terminating chamber, and is sealed at those points of passage to prevent leaks. The transfer pipe includes an inner primary supply pipe for transferring fuel and an outer secondary containment pipe for defining an interstitial space between the primary pipe and the containment pipe.

In a preferred embodiment, the device further includes monitoring means for monitoring the interstitial space between the containment pipe and the primary pipe in order to detect leaks.

The present invention also relates to a variety of transfer pipes useful in the system of this invention. One form of pipe which is suitable for use as a transfer pipe in the present invention comprises an outer damage protection layer, an inner permeation barrier layer having a smooth surface for contact with the contents of the pipe, and a middle flexible fill layer between the outer and inner layers and a cross directional, helically wound fiber reinforcement on the middle layer and in contact with the outer layer. This pipe would form the primary or inner pipe, and would be used with an outer containment pipe.

A preferred transfer pipe of the present invention may generically be described as a flexible double wall pipe assembly. In its preferred form, the double wall pipe includes an inner pipe, and an outer pipe which is in radial communication with the outside surface of the inner pipe in such a manner that a small interstitial space between both walls is created to permit fluid and gas migration from one end of a pipe section to the other end. This flexible double wall pipe section may have an inner pipe and outer pipe in radial communication which defines an interstitial space between both walls to permit fluid and gas migration in both a radial and a longitudinal direction, even under outside pressures created from underground burial conditions. One preferred form of this flexible double wall pipe includes a plurality of internally facing longitudinal ribs on the inner surface of the outer pipe, or externally facing longitudinal ribs on the outer surface of the inner pipe. In either design, a plurality of circumferentially spaced ribs extend radially from one of the pipe members to the other pipe member such that the ribs have a surface which confronts and snugly engages the other pipe to define the interstitial space between the two pipes. The confronting surfaces of the ribs have a predetermined configuration in at least the longitudinal direction to permit migration of fluid in the interstitial spaces in all directions.

A preferred type for use with fluid transfer systems in accordance with the present invention includes an outer jacket having a uniform thickness of sufficient size to provide a barrier layer and an inner barrier layer which defines the interior of the pipe. Between the inner barrier layer and the outer jacket is a stand-off layer including a cylindrical portion having circumferentially spaced ribs extending radially outwardly from the stand-off layer to engage the inside of the outer jacket. The ribs define a plurality of interstitial spaces between the stand-off layer and the jacket. Preferred stand-off layers are formed from polyethylene and other similar inexpensive materials. Most preferred are the low density polyethylene molded resins.

In this preferred embodiment, the pipe may also include a filler layer having a uniform thickness and being positioned in contact with the outside of the inner barrier layer and the inside of the stand-off layer. Fibrous reinforcement wound on the outer surface of the filler layer, in the form of polyester fibers, or wires, may also be employed to increase the strength of the pipe.

Another form of double wall pipe which may be used in the present invention comprises a flexible inner pipe and a plurality of outer pipe sections which are joined together at their terminal ends by a threaded coupling means. Preferably, the threaded coupling means includes a tapered annular seal at each terminal end for engagement with the outer surface of the outer pipe upon tightening of the threaded coupling means.

Yet another double wall pipe section useful in the present invention as a transfer pipe comprises an inner flexible pipe and an outer, relatively rigid pipe having terminal ends connected by bonding the terminal ends to a coupling. The coupling comprising a tube having an inner diameter substantially equal to the outer diameter of the outer pipe, and where the terminal end of the outer pipe is tapered to permit application of a bonding material between the coupling tube and the terminal end.

BRIEF DESCRIPTION OF THE DRAWINGS

These and other objects of the present invention and the various features and details of the operation and construction thereof are hereinafter more fully set forth with reference to the accompanying drawings, where:

FIG. 4 is a plan view of the flexible single wall primary piping showing its bend radius.

FIG. 5 is an enlarged transverse sectional view taken on line 5,5 of FIG. 4.

FIG. 6 is a fragmentary sectional view taken on line 6,6 of FIG. 5.

FIG. 7 is a plan view of a flexible coaxial piping section showing its bend radius.

FIG. 8 is an enlarged transverse sectional view taken on line 8,8 of FIG. 7.

FIG. 9 is a sectional view taken on line 9,9 of FIG. 8.

FIGS. 17A–17E are fragmentary plan views of non-flexible containment pipe installed into four different directional long bend radius directional couplings, along with one straight coupling, all of which are joined by means of a compression coupling.

FIG. 18 is an enlarged fragmentary sectional view taken on line 18,18 of FIG. 17E showing two non-flexible containment pipe lengths joined together by means of a compression coupling.

FIGS. 19A–19E are fragmentary plan views of non-flexible containment pipe installed into four different long bend radius directional couplings, along with one straight coupling, all of which are joined by means of an adhesive resin.

FIG. 20 is an enlarged fragmentary sectional view taken on line 20,20 of FIG. 19E showing a junction using an adhesive resin.

FIG. 24 is a sectional side elevational view of a terminating chamber showing one coaxial pipe section connected to the dispenser safety valve by a terminating plumbing assembly.

FIG. 25A is an exploded side elevational view showing the component parts required for a coaxial pipe clam coupling assembly.

FIG. 25B is a fragmentary side elevational view showing the coupling of two sections of coaxial pipe to a "T" fitting. One side of the fitting is shown coupled to a coaxial pipe by means of the clam coupling assembly shown in FIG. 25A. The other side of the fitting shows the coaxial pipe and gasket exploded away from the fitting.

FIG. 31 is a semi-schematic side elevational view of a preferred form of co-axial pipe shown in a sequential, layered configuration.

FIG. 32 is a semi-schematic side elevational view of a preferred form of pipe similar to that in FIG. 31, with an additional embodiment shown therein.

DETAILED DESCRIPTION OF THE PREFERRED EMBODIMENT

Figure 1:
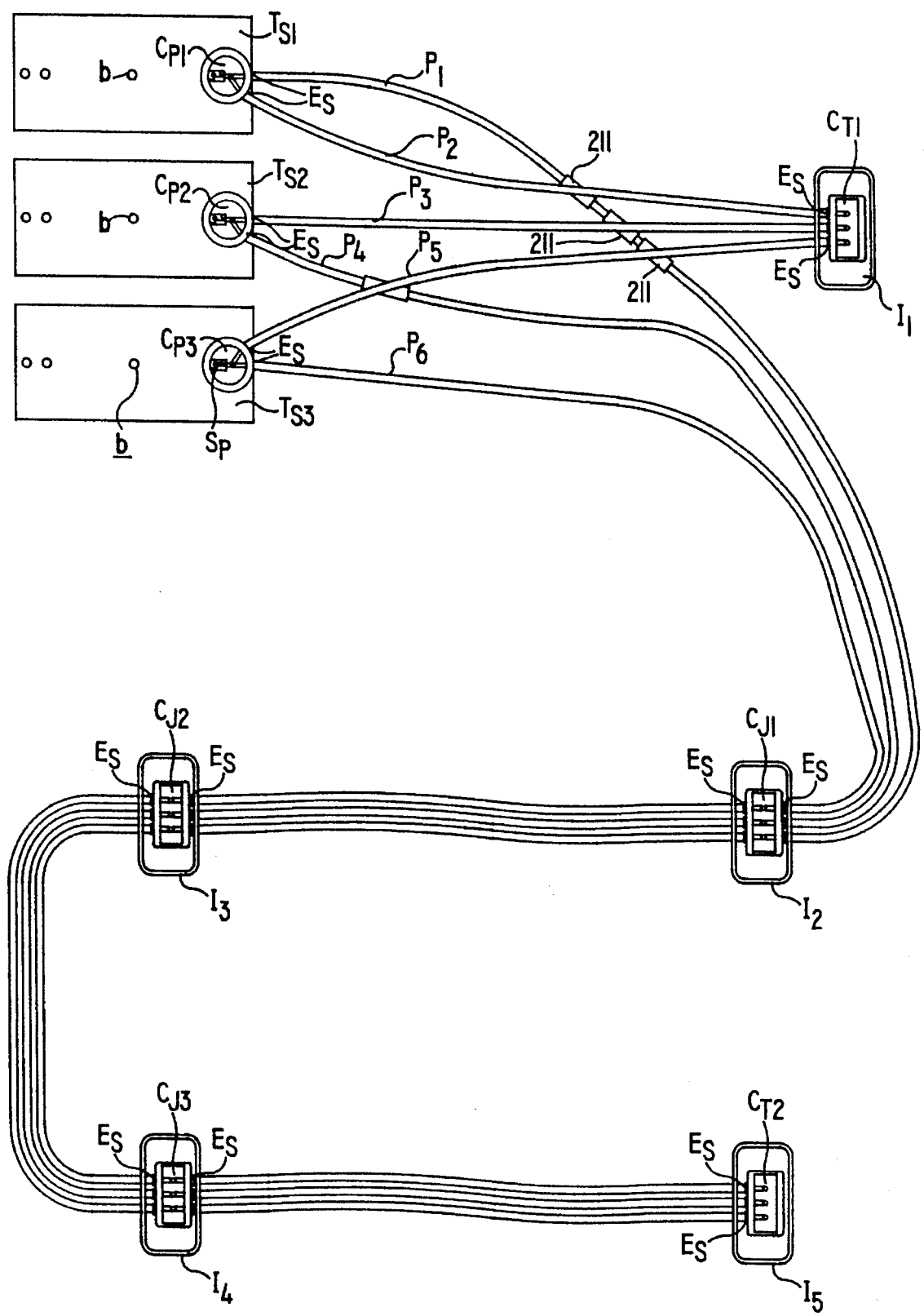
FIG. 1 is a diagrammatic overhead plan view of a fuel storage, transmission and dispensing facility which includes originating junction and terminating surface access chambers interconnected by a secondarily contained piping system.

FIG. 1 of the present invention shows generally a diagrammatic overhead plan view of a fuel storage, transmission and dispensing facility such as a typical service station facility. This facility includes a plurality of underground fuel storage tanks $T_{S1}$, $T_{S2}$ and $T_{S3}$, each of which are fitted with a number of inner access bungs b to provide access to the contents of the tanks. Located on top of a bung b on each of the storage tanks is a supply pump $S_P$ which is contained in a pump containment chamber $C_P$. Thus, tank $T_{S1}$ has a pump containment chamber $C_{P1}$, storage tank $T_{S2}$ has a pump containment chamber $C_{P2}$ and storage tank $T_{S3}$ has a pump containment chamber $C_{P3}$.

Fuel is withdrawn from the storage tanks $T_{S1}$, $T_{S2}$, $T_{S3}$ by the supply pump $S_{P1}$, $S_{P2}$, $S_{P3}$ and is dispensed from the pump containment chamber $C_{P1}$, $C_{P2}$, $C_{P3}$ through various piping as will be described. Each of the pump containment chambers serves several purposes. Normally, storage tanks are buried and access to the tanks is provided through a man-hole or cover. Since the supply pump sits directly on top of the storage tank, it must be protected from back fill cave-ins or other intrusions. Similarly, it is necessary to be able to service the supply pump and to provide access to any piping which might emanate from the supply pump to the various dispensing stations.

Piping exits from each of the pump containment chambers as is shown in FIG. 1. Exiting from storage tank $T_{S1}$ are pipes $P_1$ and $P_2$. Similarly, exiting tank $T_{S2}$ are pipes $P_3$ and $P_4$ and exiting from tank $T_{S3}$ are pipes $P_5$ and $P_6$. Each of these pipes serve two purposes, as will be described in greater detail hereinafter, in that they provide a primary pipe for transferring fuel from the storage tank to its dispensing station and they provide a containment pipe which contains, for at least a short period of time, any spill or other leakage from the primary pipe. Each of the pump containment chambers are provided with entry or exit seals which are physically attached and sealed to the side wall of the containment chamber. As will be described hereinafter, the piping section is connected and sealed to the flexible entry seal on the inside of the originating chamber by means of a metal band clamp.

Turning again to FIG. 1, the piping $P_2$, $P_3$ and $P_5$ exit storage tanks $T_{S1}$, $T_{S2}$ and $T_{S3}$, respectively, and enter into terminating chamber $C_{T1}$ located on above-ground service island $I_1$ through an entry seal $E_S$ for each pipe line. Terminating chamber $C_{T1}$ lies directly under an above-ground dispensing unit, such as a service station dispensing pump for gasoline or other fuels, and is directly connected thereto for operation. Similarly, piping $P_1$, $P_4$ and $P_6$ exit the three storage tanks and pass through a plurality of junction chambers $C_{J1}$, $C_{J2}$ and $C_{J3}$ and terminate in terminating chamber $C_{T2}$. These junction chambers are located on islands $I_2$, $I_3$ and $I_4$, respectively, as is shown in FIG. 1, and terminating chamber $C_{T2}$ is located on above-ground service island $I_5$.

The arrangement of storage tanks and dispensing systems shown in FIG. 1 is different from conventional, previously known underground storage tank supplies for a plurality of above-ground fuel dispensing stations in several ways. Each of the supply pumps and above-ground dispensing units are contained within a containment chamber which serves several purposes. First, the pump or dispensing unit is accessible for repair or evaluation. Second, the piping which passes through an entry or exit seal, can be monitored at one or both ends to determine the existence of leaks or blockage. Also, the containment chambers themselves provide a measure of safety in containing the operating parts of the system while protecting those parts from intrusion such as, for example, by back fill cave-ins.

One of the primary features of the present invention is the use of piping as shown in FIG. 1 which is operably connected to the supply pump and to the above-ground dispensing units located on the various above-ground service islands. As the piping passes through openings in the originating chamber and in the various junction chambers and terminating chambers, sealing means are provided to seal passage of the transfer pipe through the opening so that the only access to the transfer pipe which is intended to be buried and out of view is through the various containment chambers. The transfer pipe itself includes an inner primary supply pipe for transferring fuel and other liquids from the storage tank to the dispensing unit, and an outer secondary containment pipe for defining an interstitial space between the primary pipe and the containment pipe. This interstitial space is important as it permits leak detection in a way that is much more effective then previously known. In point of fact, the prior method for determining the existence of a leak in a pipe connected to a chamber has been, in some cases, limited to waiting for the leak to somehow reach one of the containment chambers which usually occur only after a great deal of ground contamination has taken place.

Figure 2:
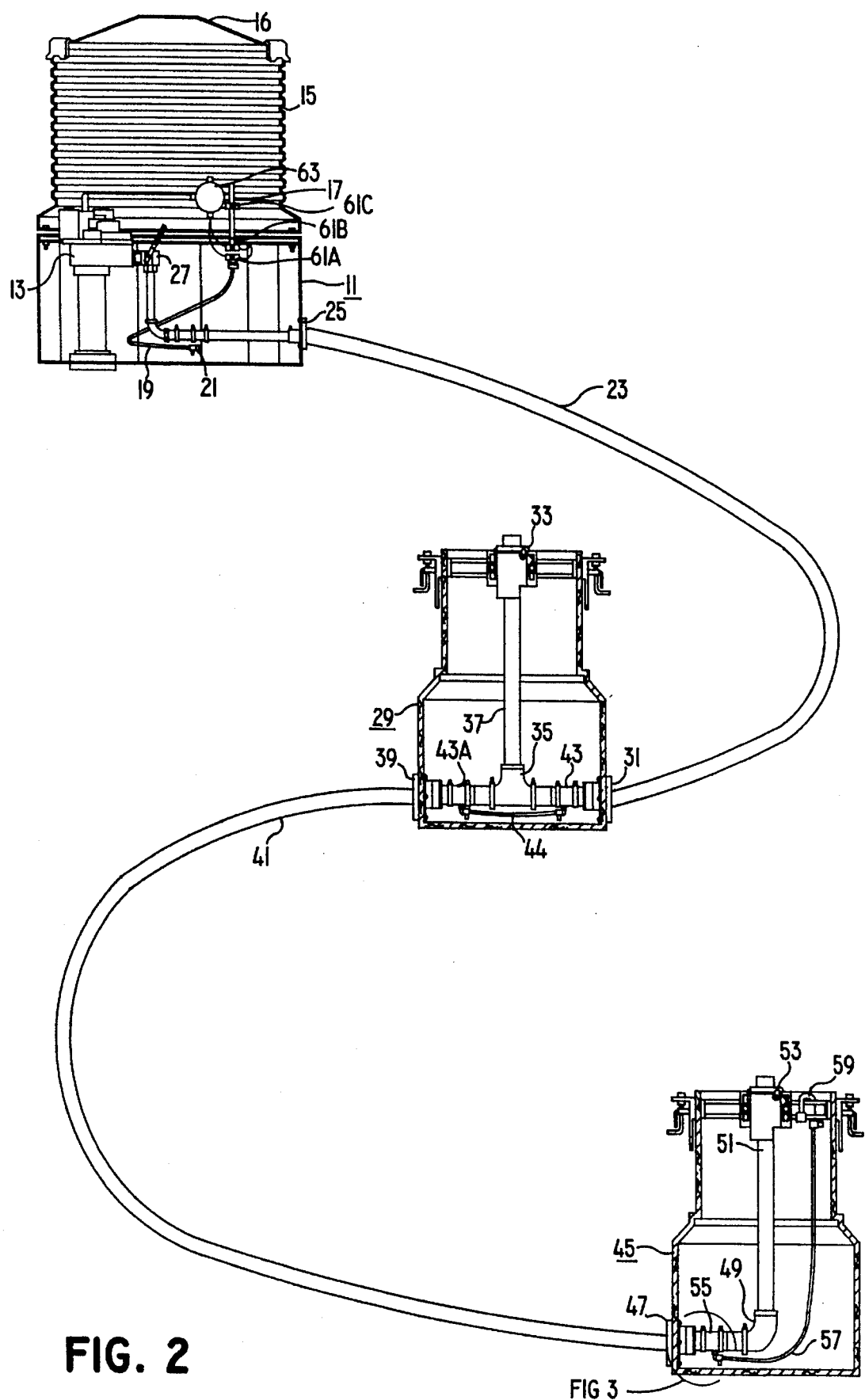
FIG. 2 is a schematic view, partially in section, showing the connecting and leakage sensing system of the present invention in a typical installation including a series of spaced sumps each having a pump take-off or the like from the primary pipe of the piping system.

Turning now to FIG. 2, the use of a transfer pipe 23,41 having an interstitial space is shown between a pump containment chamber 11 and various above-ground dispensing units 29,45. Pump containment chamber 11 provides protection for and encloses supply pump 13, access to which is provided via sump 15 and removable sump cover 16. Monitoring unit 17 is used to determine the existence of any leaks in the primary piping system through the use of vacuum, gas pressure or liquid level detection. While all three methods are suitable, the embodiment shown in FIG. 2 includes a liquid level detection system in monitoring device 17. The fluid is contained in the interstitial region of the transfer pipe and flows to the monitoring device 17 via tube 19 and connecting boot 21. Boot 21 is more fully described in my copending patent application entitled CONNECTING DEVICE FOR PIPE ASSEMBLES, filed Aug. 3, 1992, having Ser. No. 07/923,831 now U.S. Pat. No. 5,398,976.

Fluid is withdrawn from a storage tank connected to supply pump 13 and passes into transfer pipe 23 through the exit seal 25 located in the wall of pipe containment chamber 11 through control valve 27 on supply pump 13.

Transfer pipe 23 enters a junction chamber 29 through entry seal 31. Transfer pipe 23 provides fuel to dispensing pump 33 after entering T-junction 35 and flowing up riser pipe 37. Fuel also passes through exit seal 39 into a second transfer pipe 41. Boots 43,43A allow for the connection of the interstitial space between the inner and outer pipes of transfer pipe 23 with the interstitial space between the inner and outer pipes of transfer pipe 41 by means of tube 44.

Transfer pipe 41 terminates in terminating chamber 45 such that fuel contained in transfer pipe 41 passes through entry seal 47, through elbow 49, riser 51, and dispenser pump 53.

Transfer pipe 23 and transfer pipe 41 have their interstitial spaces connected via tube 44, which is in turn operably connected via boots 43 and 43A in junction chamber 29. The interstitial space in transfer pipe 41 is then connected via boot: 55 and tube 57 to supply inlet fitting 59 for introducing fluid into the interstitial space between the inner primary supply pipe and the outer secondary containment pipe of transfer pipes 23 and 41. Monitoring unit 17 includes a plurality of level detectors 61A, 61B and 61C which detect the amount of fluid contained in the interstitial space relative to a fixed point on pump containment chamber 11. Alarm 63 is operably connected to supply pump 13 so that the presence of an excess amount of fluid with interstitial space, such as when the inner supply pipe breaks, activates sensor 61A and shuts down supply pump 13. Similarly, if the outer containment pipe is broken, and fluid escapes from the interstitial space, both sensors 61B and 61C will be activated, again causing a signal to terminate the operation of supply pump 13. If, as is often the case, there is a relatively slow loss of fluid in the interstitial space via evaporation for example, only sensor 61B will be activated and an instructive alarm can be sent to the control system, not shutting supply pump 13 off, but providing a signal suggesting that more fluid be added via supply inlet 59.

Figure 3:
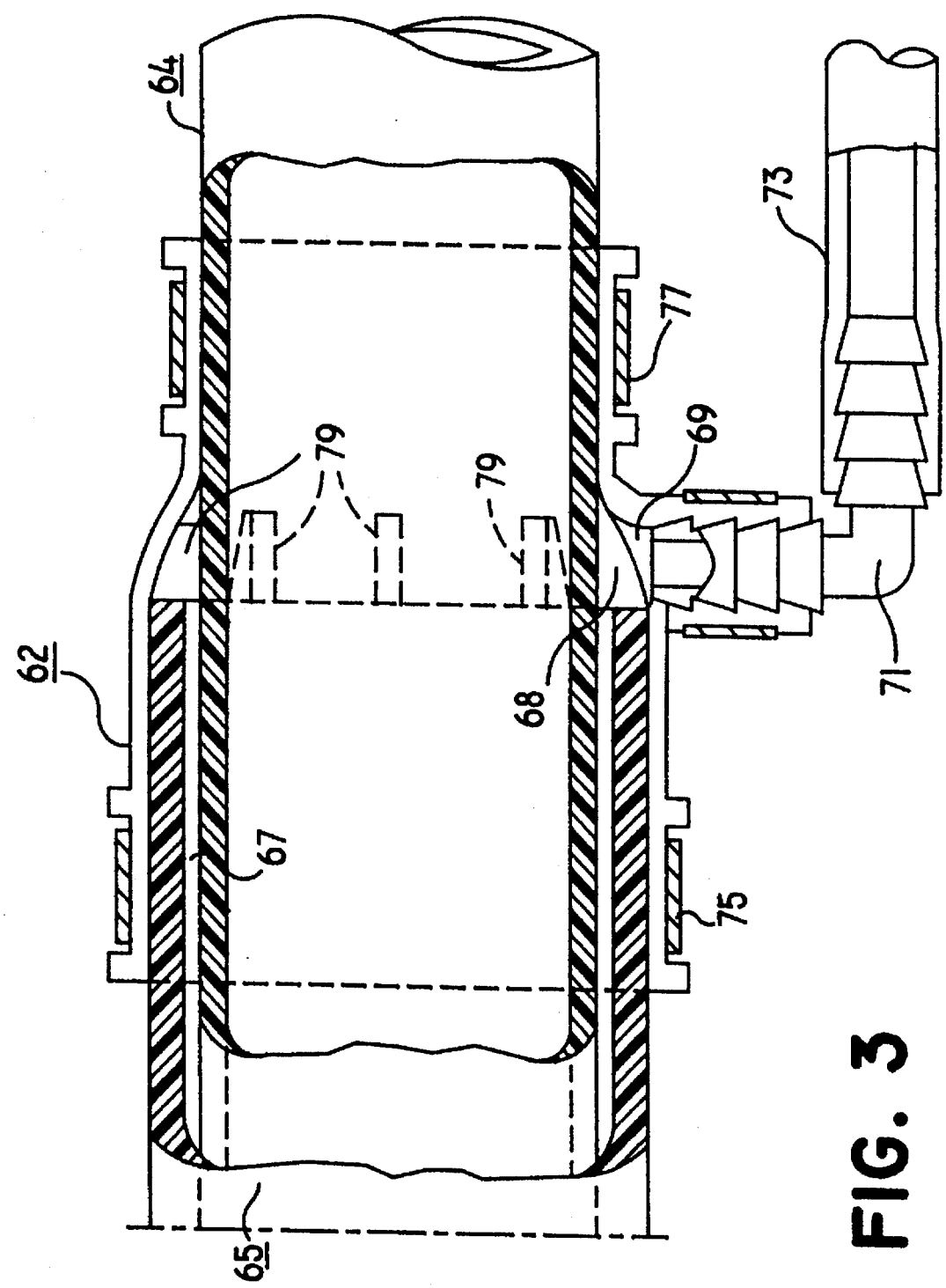
FIG. 3 is an enlargement of the detail contained within the dot and dash outline of FIG. 2 and designated FIG. 3, showing the connected boot portions of the inner and outer coaxial pipes in section.

Turning now to FIG. 3, the construction of boot 62 is shown in relationship to the inner primary supply pipe 64 and the outer secondary containment pipe 65. Inner pipe 64 and outer pipe 65 define an interstitial space 67 between them which communicates with a circumferentially extending chamber 68 and radially extending port 69 to elbow fitting 71 and tube 73 which may be connected to another boot, or to a monitoring system as previously described. Boot 62 snugly fits the outside of outer secondary containment pipe 65 and is held in place by fastening straps 75. As foot 62 is tapered, its other end is snugly fastened to inner pipe 64 by fastening strap 77. It should be noted that ribs 79, which are located on the inside of boot 62 and which abut against the end of the outer secondary containment pipe 65, locate interstitial space 67 with respect to radial port 69 and allow for communication between interstitial space 67 and the outside.

Turning now to FIGS. 4, 5 and 6, a flexible pipe for use as a primary pipe in such secondarily contained underground piping systems is shown. Pipe 80 is sufficiently flexible to have a minimum installed bend radius at 82. Pipe 80 has as its outer layer 81, a damage protection layer 80 which is spaced from an inner permeation barrier layer 83 by a flexible inner filler layer 84 which permits the pipe 80 to be bent as shown at curve 82 in FIG. 4. Shown in FIG. 6 is helically wound fiber reinforcement 85 which gives additional strength to primary pipe 80. Pipe 80 is a preferred primary pipe having the outer damage protection layer 81, the inner permeation barrier layer 83, the middle flexible fill layer 84 between the outer layer 81 and the inner layer 83, and a cross directional helically wound fiber reinforcement 85 on the middle layer 84 and in contact with the outer layer 80.

Shown in FIGS. 7, 8 and 9 is the preferred coaxial transfer pipe 87 for use with the previously described system of this invention. Pipe 87 is flexible in that it will bend over at least minimum radius 89. Pipe 87 is comprised of an outer secondary containment layer 91 with a plurality of radially extending inward ribs 93 to create an interstitial space 95 between the outer secondary layer 91 and the inner primary pipe 97. Inner primary pipe 97 includes an inner flexible filled layer 99, which encapsulates a helically wound fiber reinforcement 101 in direct contact with an inner fluid permeation barrier layer 103.

FIG. 9 shows these same pipes in cross section at line 9,9 of FIG. 8 taken along the axis of the pipe 87, once again showing the outer layer 91 and ribs 93 defining interstitial spaces 95 between the outer layer 91 and the inner pipe 97. Again, inner pipe 97 includes an inner flexible filler layer 99 encapsulating the helically wound fiber reinforcement 101 which provides structural strength to the inner fluid permeation barrier layer 103. Because of this unique design, it is possible to provide a secondary containment layer which is capable of detecting breaks at any point in the inner pipe 97. A small interstitial space 95 allows for the use of relatively small volumes of fluid, and therefore a relatively high degrees of accuracy in monitoring the changes in the interstitial space.

In addition, the primary pipe 97 can be manufactured from a relatively strong material such as nylon and, because of the rib construction, the outer pipe 91 can be manufactured from polyethylene or other thin plastic materials which are suitable for secondary containment. Thus a very thin plastic outer pipe 91 is supported by the inner pipe 97 and the ribs 93, particularly when there is a snug fit causing the ribs 93 to be in snug contact with the inner pipe 97. The advantage of this design is that the two pipe system is not one piece, thereby giving much greater protection since a puncture of one pipe does not inherently mean a puncture of the other. The two pipes do not move with respect to each other and therefore do not cause wear due to friction. Because of the narrow cross section of the ribs, virtually no puncture goes undetected.

Figure 11:
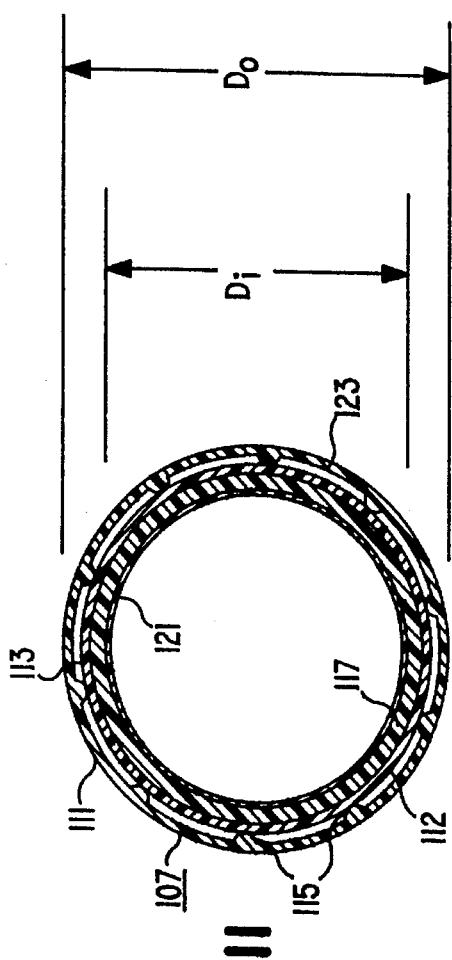
FIG. 11 is a transverse sectional view taken on line 11,11 of FIG. 10.
Figure 10:
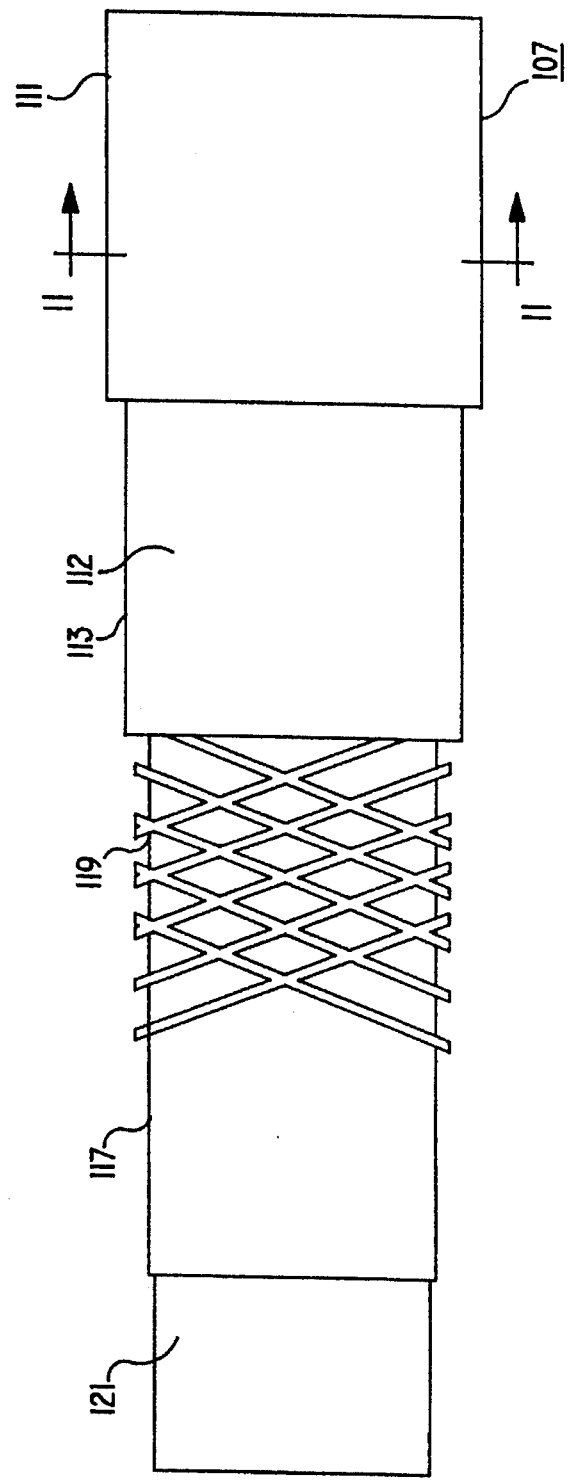
FIG. 10 is a semi-schematic side elevational view of one form of coaxial pipe shown in a sequential layered configuration.
Figure 12:
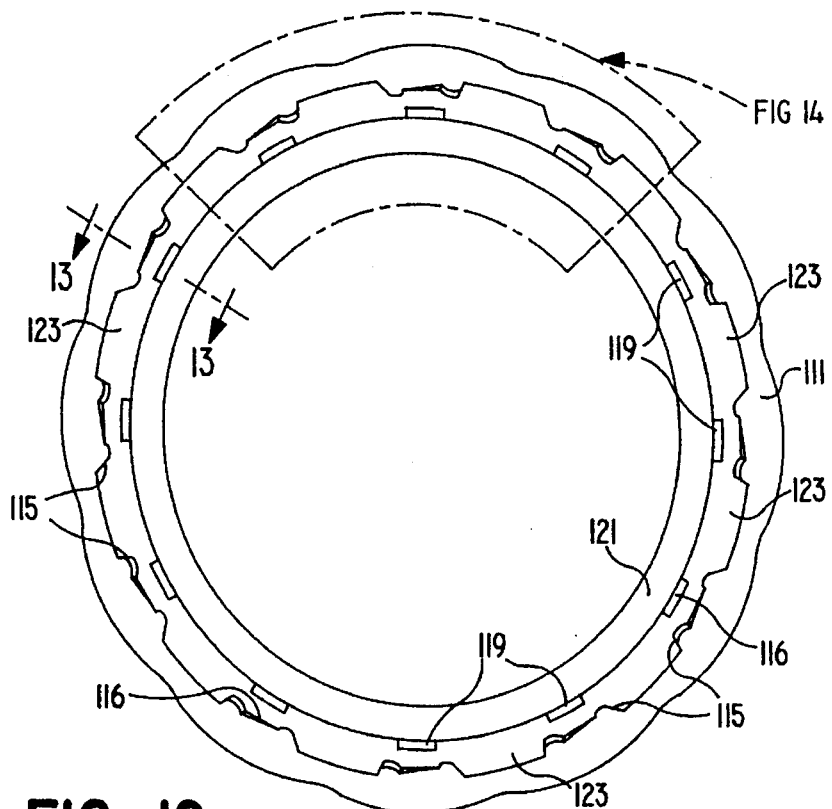
FIG. 12 is an enlarged end view of a flex tube showing both the inner tube and the circumferentially embracing outer tube.
Figure 13:
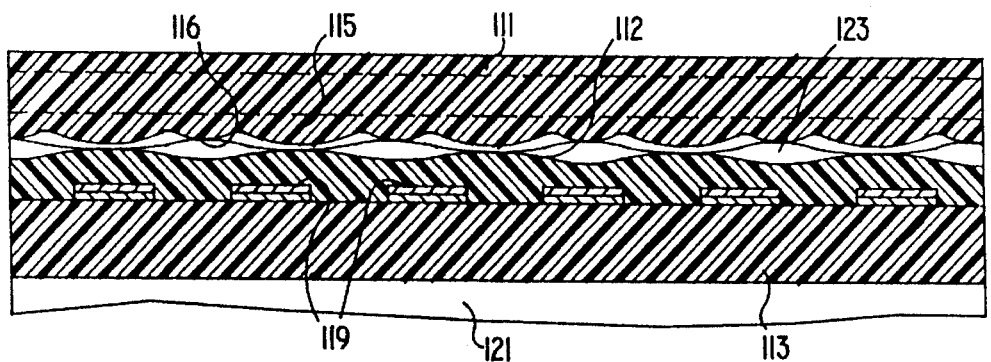
FIG. 13 is a greatly enlarged fragmentary sectional view taken on line 13,13 of FIG. 12 showing the undulating interface of the inner and outer tubes.
Figure 14:
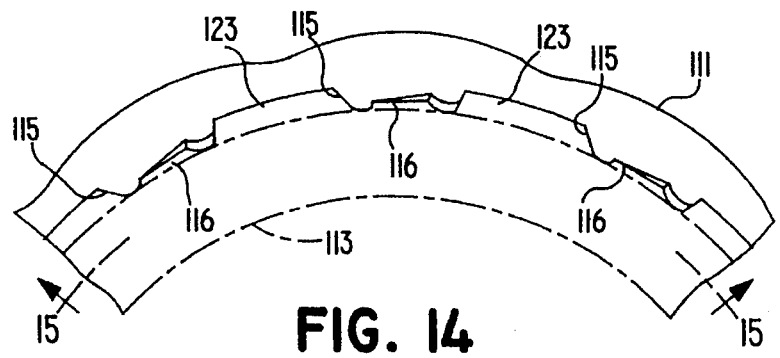
FIG. 14 is an greatly enlarged fragmentary end elevational view of the detail contained within the dot and dash region of FIG. 12 and designated FIG. 14. The outer tube is shown in full line, and the inner tube and inner and outer diameters are shown in dot and dash line.
Figure 15:
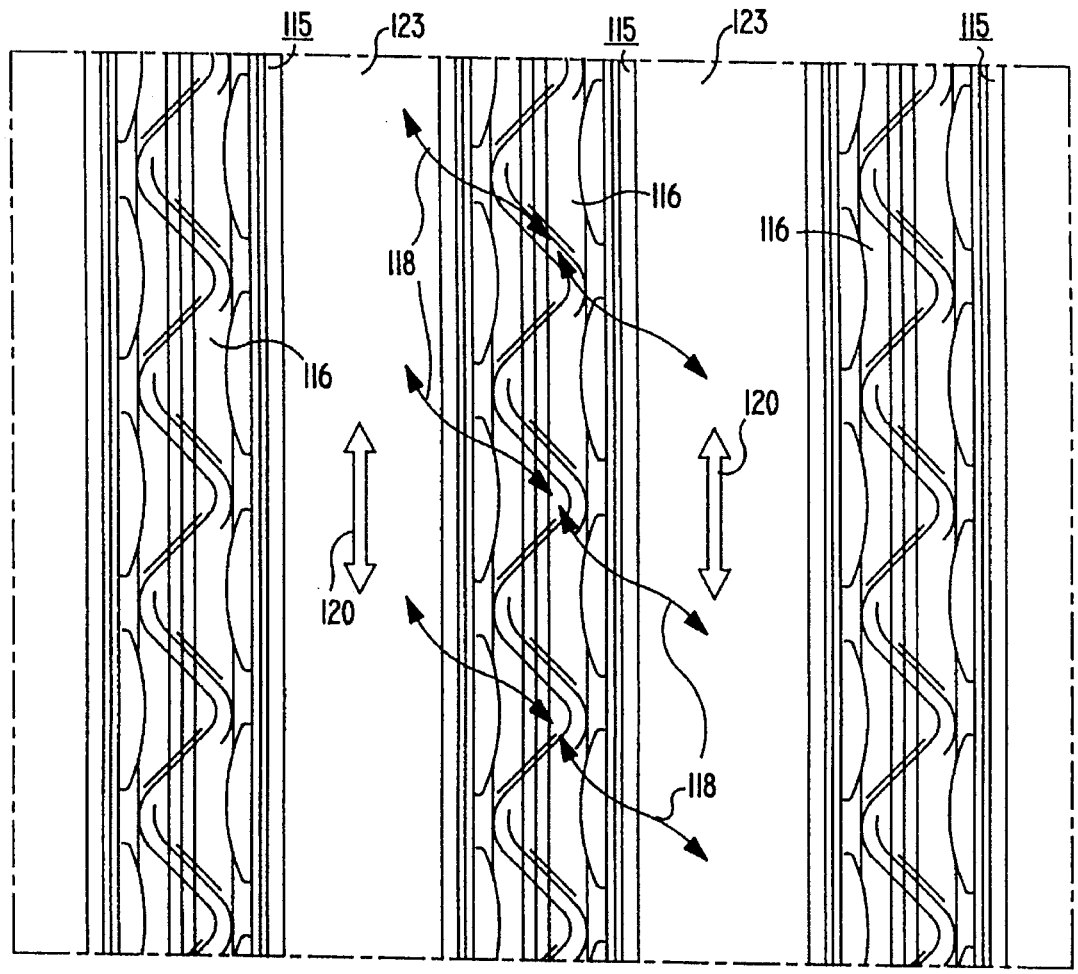
FIG. 15 is a development plan view taken on line 15,15 of FIG. 14 showing details of the lands and grooves on the inner surface of the outer tube.

FIGS. 10 and 11 show a particularly preferred version of the two pipe coaxial transfer pipe of the present invention. Pipe 107 has an outside diameter $D_o$ of approximately two inches, while the inner pipe 109 has an inner diameter $D_i$ of approximately one and one-half inches. Pipe 107 has a stand-off containment jacket layer 111 which is manufactured from either low density polyethylene, mid-density polyethylene, Kynar or other similarly materials. Layer 111 of pipe 107 is separated from the outer layer of the inner pipe by radially inwardly extending ribs 115 which are spaced circumferentially around the outer surface 112 of the inner pipe 113. The inner pipe 113 is a filled layer of approximately 40 to 60 mils in thickness and is made from material such as low density polyethylene. Outer layer 113 is spaced from a middle filler layer 117, also made of low density polyethylene and having a thickness of about 40 to 60 mils, by polyester fiber reinforcement 119. Finally, on the inside of pipe 113 is a barrier layer 121 of approximately 10 to 20 mils in thickness, typically manufactured from Kynar or other similar materials.

While the size of the pipes will be determined by specific needs of the specific application it has been found that the ratio of the primary volume in inner pipe 113 to secondary volume in the interstitial space 123 should preferably range from 5:1 to 50:1 and more preferably 10:1 to 25:1. This ratio for the design described above is about 17:1. Thus, the flexible double wall pipe assembly shown in FIGS. 10 and 11 describes the inner pipe 113 and the outer pipe layer 111 which circumscribes the inner pipe to form a plurality of circumferentially spaced ribs 115 having a surface snugly confronting and engaging the other pipe to define a plurality of interstitial spaces 123. The confronting surfaces of the ribs 115 have a predetermined configuration in the longitudinal direction to permit migration of a fluid in the interstitial space region 123 in all directions. Interstitial spaces 123 permit fluid and gas migration from one end of the pipe section to the other, in both radial and longitudinal directions, even under outside pressure created from underground burial conditions. Thus, since volume is area times length, the ratio of the cross sectional area of pipe 113 and interstitial space 123 is the same as above.

The unique and advantageous construction of the flexible tube of FIGS. 10 and 11 is shown in greater detail in FIGS. 12–16, in which the relationship of the inner pipe 113 and outer pipe 111 with the interstitial space 123 is illustrated. Outer pipe 111 conforms to and functionally embraces inner pipe surface 113 so as to provide structural strength to the thin outer pipe 111. Pipe 111 has previously been described as being made from polyethylene and will derive structural strength from the stronger inner pipe 113.

Figure 16:
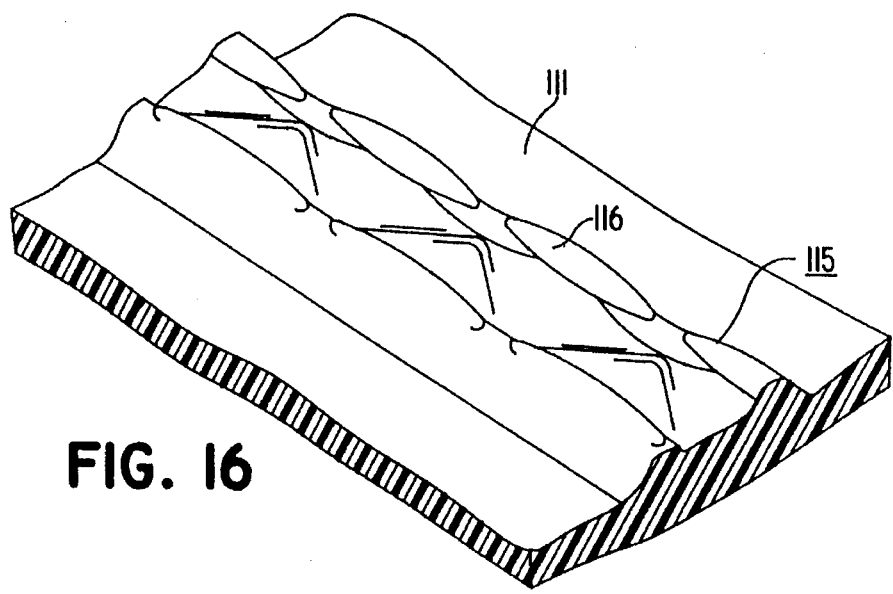
FIG. 16 is an enlarged fragmentary isometric view of a land having an undulating surface pattern that is formed during the extrusion process.

As can be seen, ribs 115 are not intended to extend in a straight axial direction but undulate in both the circumferential and axial directions. Undulating surfaces 116 form part of ribs 115 and structure the interstitial space 123 to permit flow in al directions between the outer pipe 111 and inner pipe 113. FIG. 16 shows direction of flow arrows 118 to indicate cross flow between ribs 115. While primary flow in the interstitial space 123 will be along the axial direction of arrow 120, some circumferential flow will also take place as shown by arrows 118.

Turning now to a different embodiment shown in FIGS. 17A–E and 18, a compression coupling 125 is used to connect a plurality of outer secondary containment pipes 127. Compression coupling 125 is also suitable for connecting sections of outer secondary containment piping which changes direction, after being formed in an elbow having a particular gradual direction turn so as to not interfere with later installation of a flexible primary pipe. FIGS. 17D, 17C, 17B, 17A also show examples of these elbows 157A, 157B, 157C and 157D, respectively.

Compression coupling 125 is shown in FIG. 18 joining two non-flexible containment pipe sections 127 onto which has been threaded a compression coupling 129 which creates an overlap butt joint whereby the compression coupling has a slightly larger inside diameter than the outside diameter of the end portion of non-flexible containment pipe 127. The compression coupling 129 also provides an internal stop 131 to butt both ends of the non-flexible pipe 127. A taper annular seal 133 is installed at the back end of the compression coupling 129 and is compression wedged into a tapered section 135 of compression coupling 129 by means of threaded compression cuffs 136. A smooth wall flexible supply pipe 137 is shown within the non-flexible containment pipe 127 and compression coupling 129.

A similar arrangement is shown in FIGS. 19A–E and 20, in which an outer relatively rigid pipe 139 has terminal sections which are connected by bonding to a coupling. Coupling 141 comprises a tube having an inner diameter substantially equal to the outer diameter of the outer pipe, with the terminal end of the outer pipe being 139 tapered to permit application of a bonding material between the coupling tube and the terminal end of the outer pipe. Shown in FIGS. 19A, 19B, 19C, 19D and 19E are sections of rigid outer secondary containment pipes 139 which are joined by coupling 141. Coupling 141 is also shown in various elbow shapes 141A, 141B, 141C and 141D.

Shown in FIG. 20 is the mechanism by which this coupling is accomplished. Specifically, pipe 139 has a tapered end 143 which is installed inside coupling 141E. The junction between containment pipe 139 and coupling 141E is an overlap joint whereby the coupling 141E has a slightly larger inside diameter then the outside diameter of the tapered end portion 143 of the pipe 139. A bonding adhesive 145 is applied in this overlap junction. The adhesive 145 should be a thermoset two part resin which, when cured, creates a homogenous bond between coupling 141 and or fitting and non-flexible containment pipe 139. Once again, non-flexible pipe 139 includes a small wall flexible supply pipe 147 which is installed within pipe 139 and compression coupling 141E after the rigid assembly has been installed in the appropriate trenches or excavated cavities for final assembly.

Figure 21A:
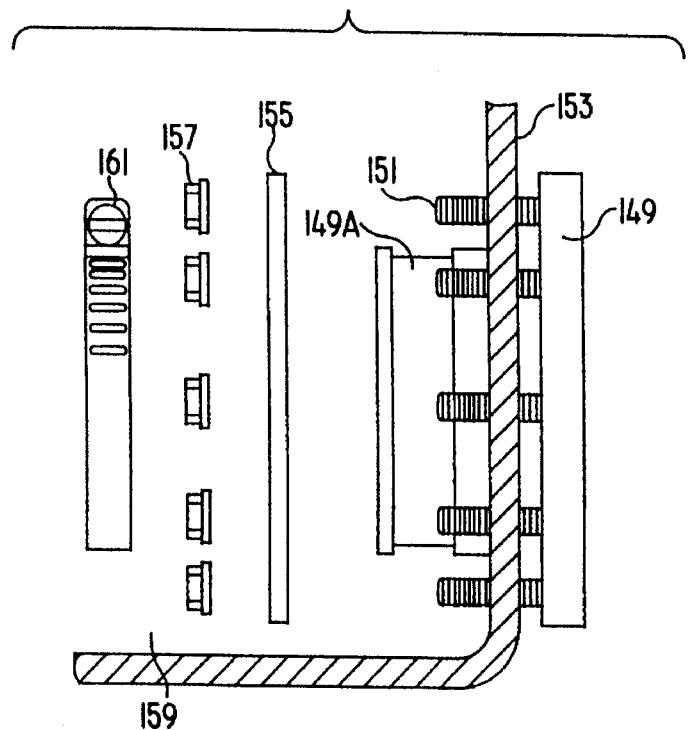
FIG. 21A is an exploded unassembled component parts view of a sealing device assembly for connecting a piping section to a wall of a chamber.
Figure 21B:
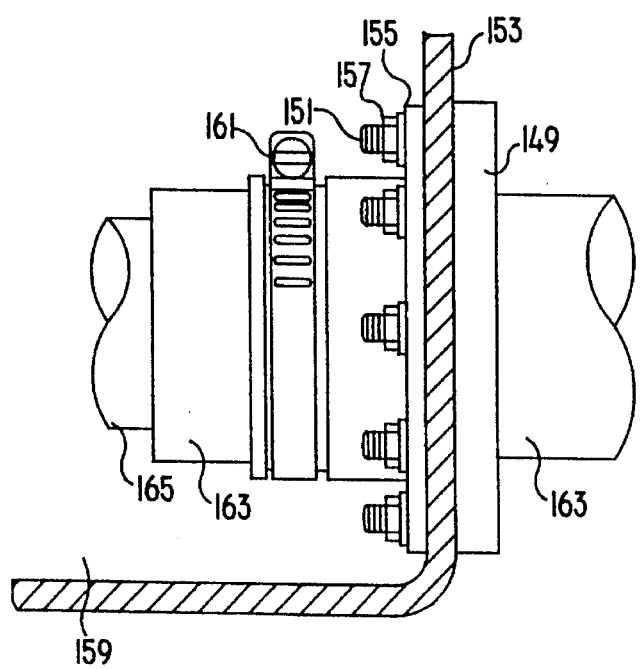
FIG. 21B is a fragmentary side elevational view showing a pipe sealing piercing a chamber wall utilizing the assembly shown in FIG. 21A.

FIGS. 21A and 21B illustrate the entry seals and exit seals which permit access to the containment chamber by the various piping systems as previously described. These exit and entry seals consist of a rubber coated steel plate 149 which has a plurality of stud fasteners 151 extending perpendicular from the plane of the rubber coated plate 149 and which are sized to fit through holes in chamber wall 153. The rubberized plate 149 also has a molded rubber annular member 149A which extends through a large hole in chamber wall 153. Also part of the entry/exit seal is a metal compression ring 155 and a plurality of stud fasteners 157 which are placed in the interior 159 of chamber wall 153. Once the stud fasteners 151 have been fully inserted through the holes in wall 153, metal compression ring 155 is installed over protruding stud fasteners 151. Next, nut fasteners 157 are installed onto stud fasteners 151 and tightened. Finally, metal band clamp 161 is installed loosely over molded rubber insert portion 149A of entry seal 149.

A pipe according to the present invention and shown in FIG. 21B is then inserted through the molded portion 149A of entry seal 149 such that the outer secondary containment pipe 163 passes all the way into the interior 159 of chamber 153, so that the inner primary pipe 165 is exposed for connection to a pump of one form or another. Once inserted, the end of the piping section is sealed to flexible entry seal 149 by tightening metal band clamp 161.

Figure 22:
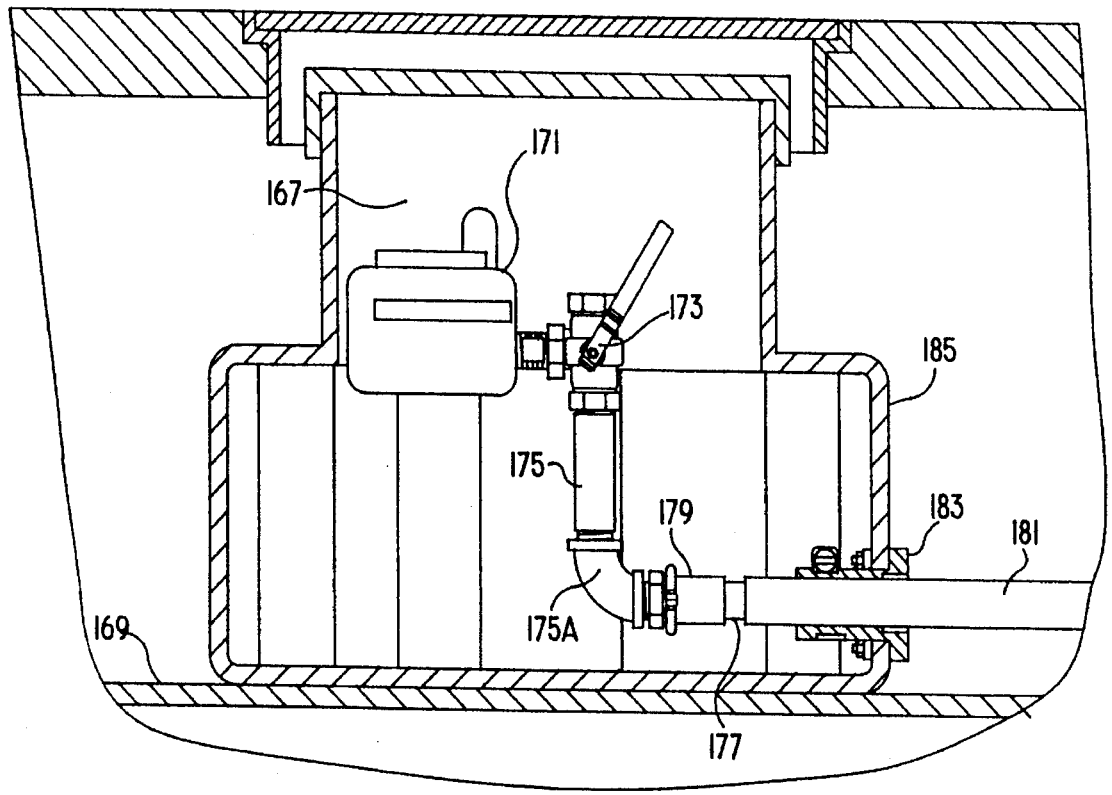
FIG. 22 is a sectional side elevational view of an originating chamber showing one coaxial pipe connected to a tank dispensing pipe and to the originating plumbing assembly.
Figure 23:
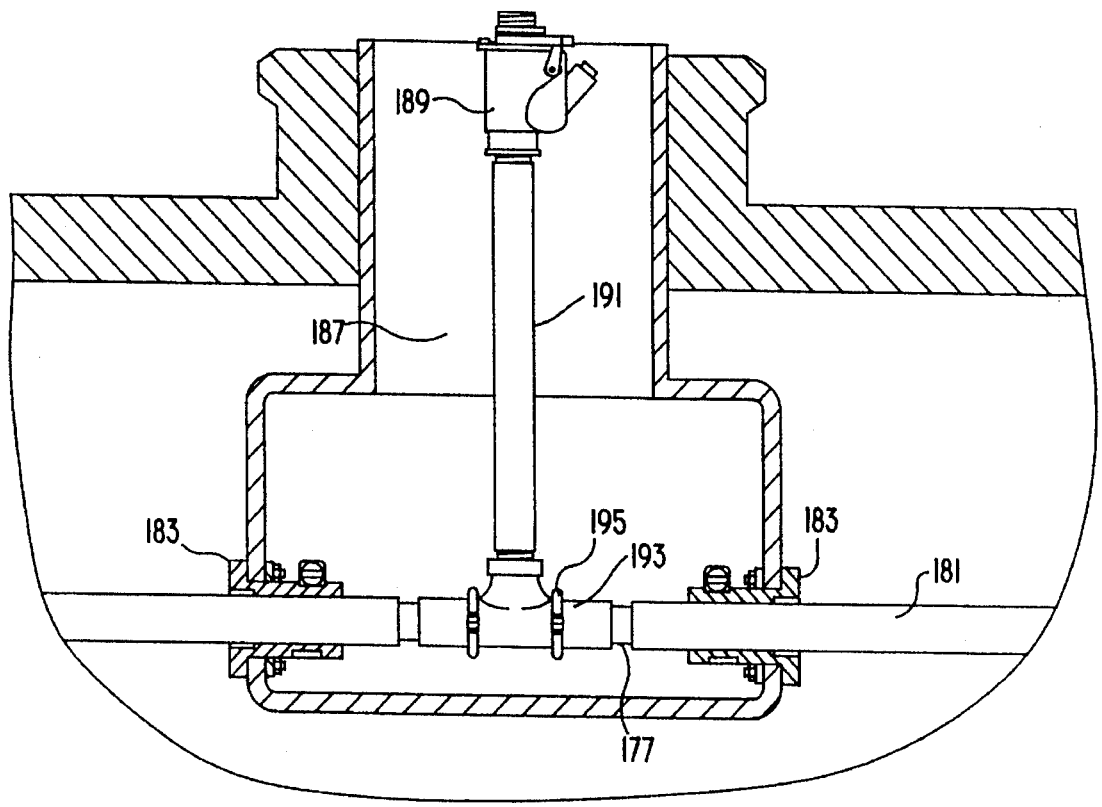
FIG. 23 is a sectional side elevational view of a junction chamber showing two coaxial pipe sections connected to the dispenser safety valve by junction plumbing.

FIGS. 22 and 23 show the operation of entry/exit seals in a larger environment of actual use. Shown in FIG. 22 is an originating chamber 167 which is located on the top of an underground storage tank 169. Pump 171 withdraws fuel which is controlled by valve 173 and standard piping 175. Piping 175 includes elbow 175A which is attached to the inner primary pipe 177 by fastener 179. The outer secondary pipe 181 passes through exit seal 183 and wall 185 of chamber 167. It should be noted that the interstitial space between the inner pipe 177 and the outer pipe 181 as previously described with respect to the specific pipes previously illustrated, is exposed and access thereto is possible. It is also possible that fastener 179 may be replaced by a boot as described previously in FIG. 3, for example.

FIG. 23 shows a junction chamber 187 which houses dispenser safety valve 189 which is connected to the dispenser pump in the normal routine manner. Riser 191 connects the dispenser safety valve 189 with the T-shaped pipe coupling 193 by being threaded thereto. Clamp 195 attaches the inner primary pipe 177 to the T-shaped pipe coupling 193. The outer secondary pipe 181 enters and exits chamber 187 using exit or entry seals 183.

FIG. 24 is similar to the structure described in both FIGS. 22 and 23. In this case, a terminating chamber 187A is fitted with dispenser safety valve 189 and riser 191, similar to FIG. 23 except that riser 191 terminates in elbow fitting 191A. Clamp 195 attaches elbow 191A to inner primary pipe 177 while entry seal 183 is fastened directly to outer secondary pipe 181.

The fastener mechanism or clamp 195 is shown in greater detail in FIGS. 25A and 25B. Riser 191 is threaded into T-pipe coupling 193 for attachment to primary pipe 177 as will be described. An internal expanded pipe coupling 197 is fitted onto inner primary pipe 177. Pipe coupling 197 includes a butt flange 199 as does the T-shaped coupling 193. A compressed O-ring seal 201, which may be made from viton rubber or teflon, is placed between butt flanges 199 and 199A to compress O-ring seal 201 by means of clam shell clamp 203 which is drawn together over butt flanges 199 and 199A using bolt fasteners 205 and nuts 207.

Figure 26:
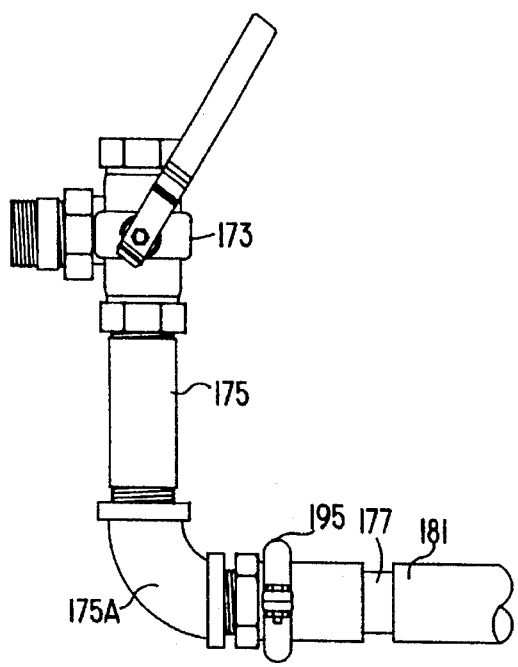
FIG. 26 is a side elevational view of a single outlet plumbing T assembly which connects the tank pump to one coaxial pipe section, all contained within the originating chamber.
Figure 27:
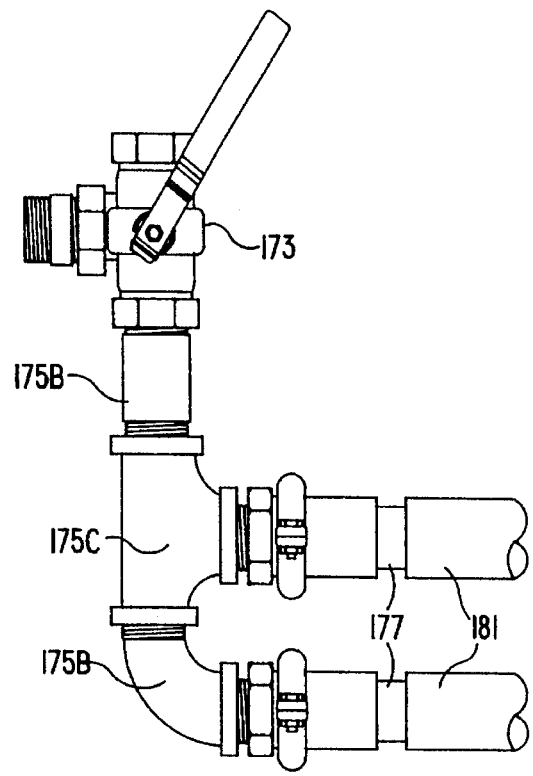
FIG. 27 is a side elevational view of a dual outlet plumbing T assembly which connects the tank pump to two axial pipe sections, all connected within the originating chamber.
Figure 28:
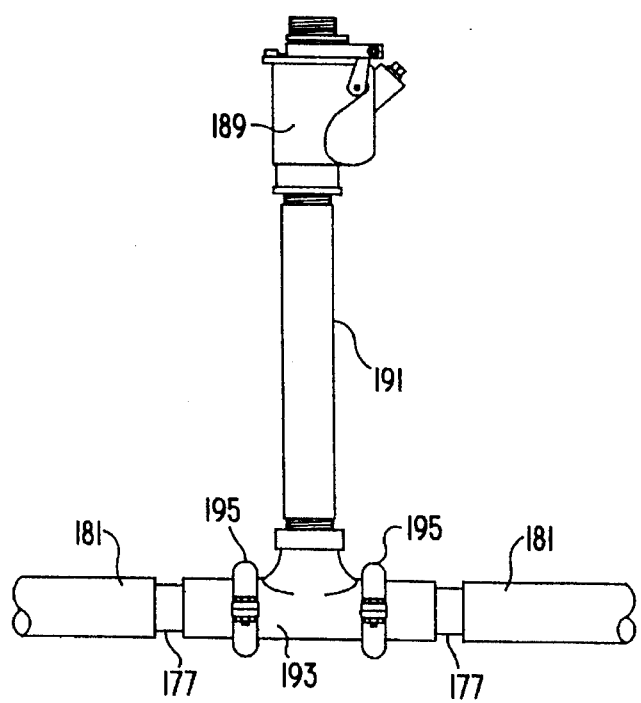
FIG. 28 is a side elevational view of a T junction plumbing assembly interconnected by two coaxial pipe sections and one non-flexible supplied pipe section, which connects to the dispenser safety valve, all contained within the junction chamber.
Figure 29:
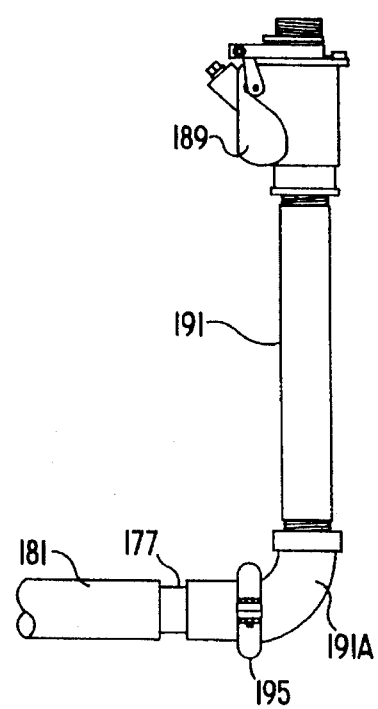
FIG. 29 is a side elevational view of a terminating plumbing assembly interconnected by one coaxial pipe section and one non-flexible supply pipe section, which is connected to the dispenser safety valve, all contained within the terminating chamber.

FIGS. 26, 27, 28 and 29 illustrate various plumbing assemblies which have been previously described in the present application. In FIGS. 26 and 27, an originating plumbing assembly is shown with a shut-off valve 173 which permits the tank and pump to be isolated from supply pipe line 181. Again, the piping includes an inner primary pipe 177 and an outer secondary containment pipe 181. This pipe is fastened to various fixtures such as elbow 175A using clamps 195 as previously described. In FIG. 27, the riser pipe 175B is shorter to accommodate the primary T-fitting 175C which is then fitted with elbow 175A. FIGS. 28 and 29 show similar plumbing arrangements.

Figure 30B:
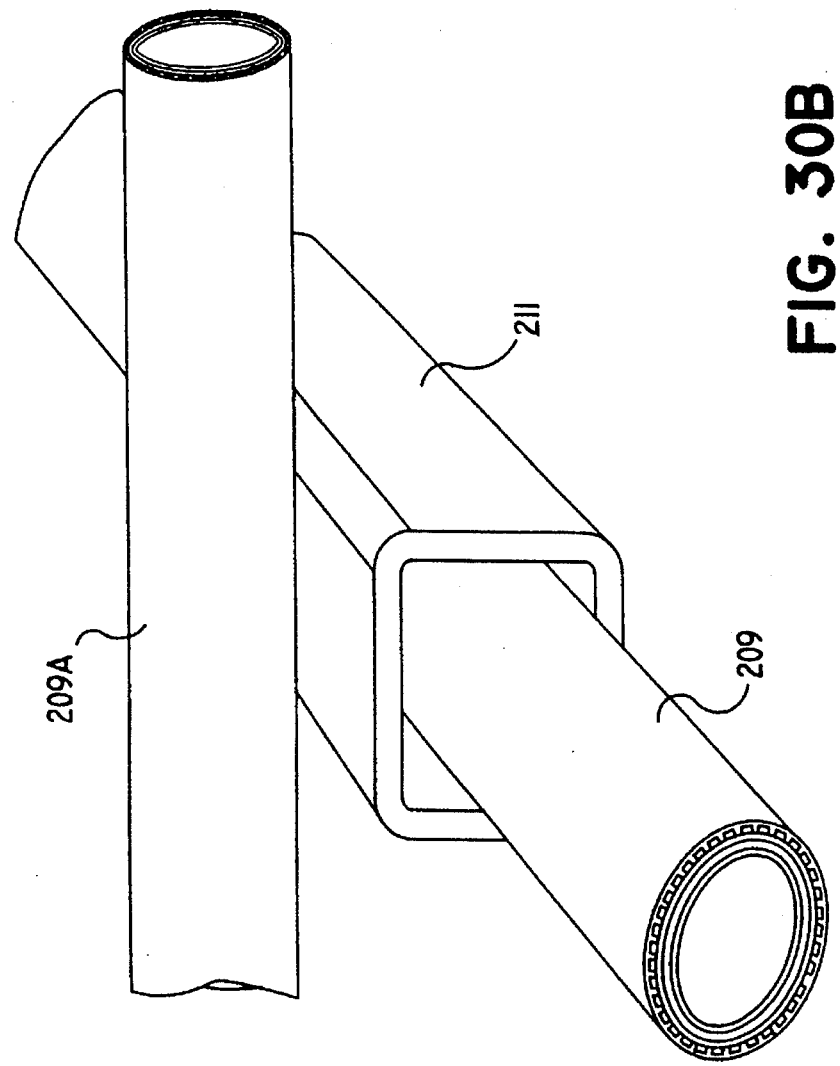
FIG. 30B is a perspective view of the cross-over conduit unit shown in FIG. 30A as applied to two coaxial pipes in a crossing mode.
Figure 30A:
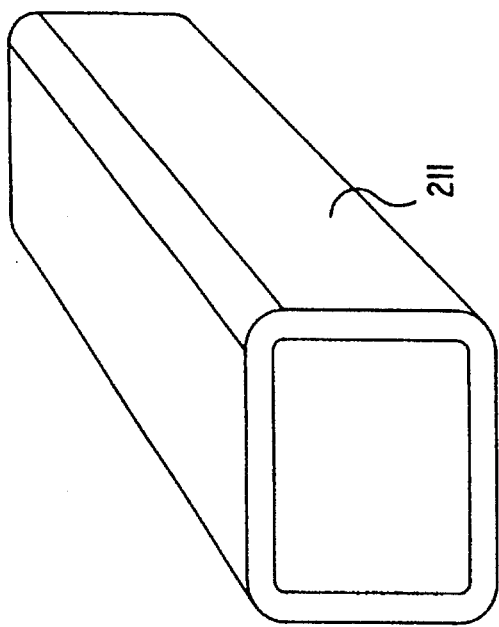
FIG. 30A is a perspective view of a cross-over conduit unit.

Finally, FIGS. 30A and 30B show the arrangement whereby a pair of coaxial pipes 209 and 209A are permitted to cross without causing damage to either pipe, using a crossover conduit 211. Crossover conduit 211 provides a flat surface for each of the pipes 209 and 209A to contact, thereby decreasing the likelihood of any creasing or bending.

FIG. 31 shows a preferred embodiment of the present invention. Outer jacket 311 has a nominal one and one-half inch outside diameter forming a flexible pipe for use in the systems of this invention, for example, and in other piping systems. The inside of the pipe shown in FIG. 31 is a barrier layer 313 formed from Kynar or other highly resistant material. The nominal thickness is from ten to about twenty mils, depending upon the particular needs of the system. Ten mils is a normally suitable thickness for forming a barrier layer for most fluid transfer piping systems.

The outer jacket 311 is also formed from a barrier material such as Kynar, but is thicker than the inner barrier layer because it is subjected to physical stress as well as a chemical environment. Typically, twenty to forty mils thickness been found to be suitable with a nominal thirty mil thickness being sufficient for most piping system environments.

Separating the outer jacket 311 and the inner barrier layer 313 is a stand-off layer 315, which will be described in greater detail herein below. While the three layers comprising the inner barrier layer 313, the stand-off layer 315, and the outer jacket 311 form the essence of this preferred pipe, other components, particularly those previously described, may also be incorporated into the pipe described herein. Specifically, a filler layer 317 is interposed between the inside of stand-off layer 315 and the inner jacket 313. Wrapped around the filler layer 317 is a reinforcement layer formed from a polyester fiber 319 which is woven and wrapped to provide additional strength. In situations where even greater strength is desired, a second wrapped or wound wire may be employed as is shown in FIG. 32, with a wound wire 321 wrapping filler layer 317 and positioned inside the stand-off layer 315.

Figure 33:
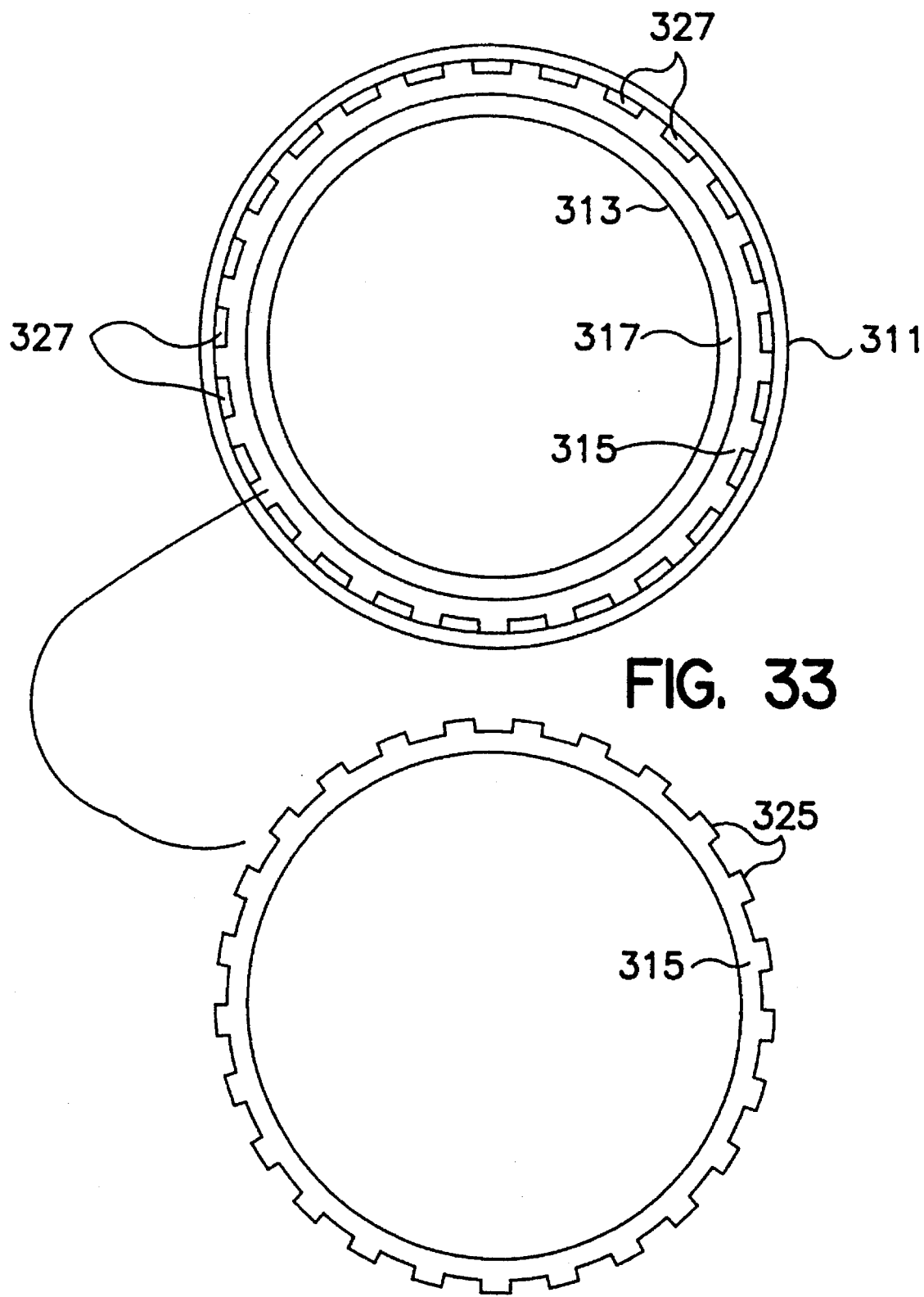
FIG. 33 is a schematic sectional view of the preferred pipes shown in FIG. 31 and 32, illustrating one of the components as having been removed.

Turning now to FIG. 33, the particular advantages of this preferred embodiment can easily be seen. Stand-off layer 325 which is manufactured from a low density polyethylene or other inexpensive material, includes a cylindrical portion having circumferentially spaced ribs 325 extending radially outwardly to engage the inside of outer jacket 311 and define a plurality of interstitial spaces 327 between the stand-off layer 315 and the jacket 311.

Because of this construction, highly effective jacket material can be used for the outer layer 311 while, at the same time, less expensive material can be used for the grooves 325 in the stand-off layer 315. Thus, the effect of creating interstitial spaces 327 is accomplished at the least amount of cost and with the easiest method of manufacture.

The piping systems of the present invention are installed much faster then normal single or double wall rigid or flexible piping systems. This is true particularly when the coaxial double wall piping described in FIGS. 4–16 is employed, because both the inner primary pipe and outer secondary pipe are integral with each other and are installed at the same time. Another consideration is that this flexible coaxial pipe is made from composite thermo-plastic materials such as nylon or nylon/polyurethane composites which provide fuel impermeability. Impermeability is defined as having less then one percent by weight loss per foot over a time period of 270 days. It is critical to provide a flexible primary pipe which will reduce or virtually eliminate the transmission of aromatic vapors of gasoline and those chemical additives in gasoline. This primary pipe accomplishes that objective. This is critical because flexible supply pipes are installed underground where aromatic explosive vapors could collect to create a potentially explosive atmosphere inside a secondary containment system in which it is placed.

In addition, the flexible coaxial pipes described above have a significant number of other improvements over prior art designs. Among these improvements are the fact that the flexible coaxial pipe of the present invention, described in FIGS. 4–16, has a smoother inner surface and a smooth outer surface which provides an ideal wall profile for attaching conventional internally expanding coupling devices. These known coupling devices have a history of providing leak-free performance. Also, the flexible coaxial pipe has an inner surface which is smooth and made of a relatively low resistance material to provide a higher hydraulic performance rating to dispense more gallons of liquid per linear foot of distance. It is appreciated that a shiny and slick inner surface provides lower resistance to fluid flow. Finally, the pipe described herein has a continuously wound fiber reinforcement which is encapsulated within the smooth outer layer and the inner smooth layer to provide high pressure capability such that the maximum burst pressure may achieve 900 psi or more. This reduces pipe kicking due to pressure surges and eliminates pipe expansion. Pipe expansion affects sensitive in-line leak detection systems. The two hard, semi-rigid and strong nylon layers also serve to provide additional pipe strength.

Having thus described the invention what is claimed is:

1. A secondarily contained underground piping system which interconnects at least one underground storage tank dispensing pump to at least one above-ground dispensing unit comprising, an originating chamber adjacent said dispensing pump and having at least one opening therein for pipe access thereto, a terminating chamber positioned under said above-ground dispensing unit and having at least one opening therein for pipe access thereto;

a transfer pipe operably connected to said dispensing pump and said above-ground dispensing unit, said transfer pipe passing through an opening in said originating chamber and an opening in said terminating chamber, wherein said transfer pipe comprises:

an inner supply pipe for transferring fluid therethrough, said inner supply pipe comprising an outer damage protection layer, an inner permeation barrier layer having a smooth surface for contact with fluid in said inner pipe, a middle flexible fill layer between said outer and inner layers;

a fiber reenforcement layer on said middle layer and in contact with said outer layer; and an outer secondary containment pipe member spaced from said inner supply pipe for defining an interstitial space between said inner supply pipe and said containment pipe, and a means for sealing said transfer pipe in at least one of said openings.

2. The system of claim 1 which further comprises a monitoring means for monitoring said interstitial space to detect leaks in said transfer pipe.

3. The system of claim 1, wherein said outer pipe member surrounds the inner pipe member;

one of said pipe members having a plurality of circumferentially spaced ribs extending radially from said one of said pipe members, said ribs having a surface confronting and snugly engaging the other pipe member for defining a plurality of interstitial spaces between the pipe members, the confronting surfaces of said ribs having a predetermined configuration in a longitudinal direction to permit migration of a fluid in said interstitial spaces.

4. The system of claim 1, wherein an inside surface of the outer pipe has a plurality of internally facing longitudinal ribs in radial communication with an outside surface of the inner pipe whereby an interstitial space between said inner pipe and said outer pipe is created to permit fluid and gas migration within the interstitial space.

5. The system of claim 4, wherein the interstitial space permits fluid and gas migration in radial and longitudinal directions therein.

6. The system of claim 4, whereby the interstitial space permits fluid and gas migration over substantially all of the pipe section.

7. The system of claim 1, wherein said outer pipe sections are joined to each other at their terminal ends by a threaded coupling means.

8. The system of claim 1, wherein terminal end sections of said outer pipe are connected by bonding said terminal end sections to a coupling, said coupling comprising a tube having an inner diameter substantially equal to the outer diameter of said outer pipe, said terminal end sections of said outer pipe being tapered to permit application of bonding material between said coupling tube and said terminal end sections.

9. The system of claim 5, wherein said ribs have confronting surfaces having a predetermined configuration in a longitudinal direction along at least one of said pipe members to permit migration of a fluid in said interstitial spaces.

10. The system of claim 1, wherein said outer damage protection layer has a thickness of about 20 to about 40 mils.

11. The system of claim 10 wherein said thickness is about 30 mils.

12. The system of claim 1 wherein said inner permeation barrier layer has a thickness of about 10 to about 20 mils.

13. The system of claim 12 where said inner permeation barrier layer has a thickness of about 10 mils.

14. The system of claim 1 wherein said fiber reinforcement layer comprises polyester fiber.

15. The system of claim 14 further comprising wire on said fiber reinforcement layer.

16. The system of claim 1 wherein said transfer pipe further comprises a standoff layer between said fiber reinforcement layer and said outer damage protection layer.

17. The system of claim 16 wherein said standoff layer is polyethylene.

18. The system of claim 1 wherein said fiber reinforcement layer is helically wound on said middle layer.

19. The system of claim 18 wherein said fiber is cross-directionally wound.

20. The system of claim 3 wherein said confronting surfaces of said ribs have a predetermined configuration in a longitudinal direction to permit migration of a fluid in said interstitial spaces in all directions.

21. The system of claim 7 wherein said threaded coupling means comprises tapered annular seals for engaging the outer surface of said outer pipe sections upon tightening said threaded coupling means.

22. The system of claim 16 wherein said standoff layer comprises circumferentially spaced ribs, said ribs extending radially outwardly from an exterior surface of said standoff layer.

23. The system of claim 22 wherein a plurality of interstitial spaces between are defined in the space between said interior surface of said outer jacket and said standoff layer.

24. A secondarily contained piping system for joining at least one storage tank to at least one dispensing unit comprising, an originating chamber adjacent a pump for removing fluid from said tank, said originating chamber having at least one opening therein for pipe access thereto, a terminating chamber adjacent a dispensing unit and having at least one opening therein for pipe access thereto, at least one transfer pipe segment for introduction into said originating chamber and said terminating chamber, means for connecting said transfer pipe to said pump, means for connecting said transfer pipe to said dispensing unit, said transfer pipe comprising,
an inner supply pipe member for transferring fluid therethrough,
said inner supply pipe member comprising an outer damage protection layer,
an inner permeation barrier layer for contact with fluid in said inner supply pipe member,
a middle flexible fill layer between said outer and inner layers,
a fiber reinforcement layer on said middle layer and in contact with said outer layers, and
an outer secondary containment member spaced from said inner supply pipe member for defining an interstitial space between said inner supply pipe and said containment pipe.

* * * * *